United States Patent
Mononobe et al.

(10) Patent No.: US 6,236,783 B1
(45) Date of Patent: May 22, 2001

(54) OPTICAL FIBER PROBE AND MANUFACTURING METHOD THEREFOR

(75) Inventors: Shuji Mononobe, Kanagawa; Motoichi Ohtsu, Tokyo, both of (JP)

(73) Assignee: Kanagawa Academy of Science and Technology, Kanagawa (JP)

( * ) Notice: Subject to any disclaimer, the term of this patent is extended or adjusted under 35 U.S.C. 154(b) by 0 days.

(21) Appl. No.: 09/180,975

(22) PCT Filed: Sep. 5, 1997

(86) PCT No.: PCT/JP97/03141

§ 371 Date: Nov. 18, 1998

§ 102(e) Date: Nov. 18, 1998

(87) PCT Pub. No.: WO98/10296

PCT Pub. Date: Mar. 12, 1998

(30) Foreign Application Priority Data

| Sep. 6, 1996 | (JP) | 8-236786 |
| Sep. 6, 1996 | (JP) | 8-236787 |
| Nov. 25, 1996 | (JP) | 8-313920 |
| Jul. 1, 1997 | (JP) | 9-176052 |

(51) Int. Cl.$^7$ ............................................. G02B 6/26
(52) U.S. Cl. ................................. 385/43; 385/123
(58) Field of Search .......................... 385/31, 43, 85, 385/127, 139, 123

(56) References Cited

U.S. PATENT DOCUMENTS

| 4,445,751 | * | 5/1984 | Divens et al. | 385/43 |
| 5,394,500 | * | 2/1995 | Marchman | 385/123 |
| 5,485,536 | * | 1/1996 | Islam | 385/31 |
| 5,664,036 | * | 9/1997 | Islam | 385/31 |
| 5,812,723 | * | 9/1998 | Ohtsu et al. | 385/128 |
| 5,812,724 | * | 9/1998 | Ohtsu et al. | 385/128 |
| 5,908,562 | * | 6/1999 | Ohtsu et al. | 216/11 |

FOREIGN PATENT DOCUMENTS

| 7218516 | 8/1995 | (JP) . |
| 7260807 | 10/1995 | (JP) . |

OTHER PUBLICATIONS

Preprints of the 57th Symposium of the Japan Society of Applied Physics, Fall 1996, the 3rd vol., (Japan), The Japan Society of Applied Physics, (Jul. 9, 1996), pp. 778.

* cited by examiner

Primary Examiner—John D. Lee
Assistant Examiner—Sarah N Song
(74) Attorney, Agent, or Firm—Jay H. Maioli

(57) ABSTRACT

An optical fiber probe having a tapered portion inclined in three stages having three inclinations is manufactured by carrying out etching on one end of an optical fiber having a second core, a first cladding and a second cladding provided in this order around a first core, in which a radius $r_4$ of an outer peripheral surface of the second cladding is $r_4 < r_{4P}$, where $$r_{4P} = r_3 + (r_3 - r_2)[(R_2 + R_3)/(R_3 - R_2)]^{1/2}$$

($r_2$: radius of the outer peripheral surface of the second core, $r_3$: radius of the outer peripheral surface of the first cladding, $R_2$: dissolution rate of the second core, $R_3$: dissolution rate of the first cladding) under the condition of $R_1 = R_2 < R_3 < R_4$ ($R_1$: dissolution rate of the first core, $R_2$: dissolution rate of the second core, $R_3$: dissolution rate of the first cladding, $R_4$: dissolution rate of the second cladding), and then performing chemical etching under the condition of $R_1 < R_2 < R_3 < R_4$.

33 Claims, 22 Drawing Sheets

$R_{11} = R_{21} < R_{31}$ $R_{12} < R_{22} < R_{32}$ $R_{13} > R_{23} > R_{33}$ $R_{12} < R_{22}$

OPTICAL FIBER PROBE AND MANUFACTURING METHOD THEREFOR

TECHNICAL FIELD

This invention relates to an optical fiber probe used as an optical probe for detecting an evanescent light in a near-field optical microscope, which is a scanning probe microscope, and a manufacturing method therefor.

BACKGROUND ART

The resolution of an image provided by an ordinary optical microscope is limited by diffraction limit (i.e., wavelength of light).

On the contrary, an optical image having a resolution exceeding the wavelength of light may be provided by using a near-field optical microscope having a probe of a nanometer-size structure. In addition, by utilizing this near-field optical microscope technique, measurement of shape and spectrum, memory operation (write/read/erase), and optical processing of objects, such as, a biological sample, a semiconductor sample, an optical memory material and a photosensitive material, may be carried out with a resolution of the order of nanometer.

An example of the near-field optical microscope is shown in FIG. 1. This near-field optical microscope 1 is adapted for detecting an evanescent light localized in a region which is extremely close to the surface of an object at a distance smaller than the wavelength of light, so as to measure the shape of the object.

Specifically, an evanescent light 2α which is generated by irradiating an object 3 with a laser beam 2 under the condition of total internal reflection is scattered at the distal end of a nanometer-size tapered portion 5 of a probe 4. In the near-field optical microscope 1 shown in FIG. 1, the probe 4 is made of an optical fiber, and the light scattered by the tapered portion 5 of the optical fiber probe 4 is guided to a core of the optical fiber through the tapered portion 5. The light guided to the core is propagated within the core, then radiated from the other end (radiation end) of the optical fiber, and detected by a detector. In this case, a two-dimensional image of detection light may be provided by causing the optical fiber probe 4 to scan on the object 3.

As the optical fiber probe 4 used in the near-field optical microscope 1, an optical fiber probe on which a light-shielding coating layer 6 made of a metal or the like is formed except for the distal end of the tapered portion 5 as shown in FIG. 2 (i.e., so-called apertured probe) may be used as well as an optical fiber probe having a conical tapered portion with its distal end formed in nanometer size (i.e., so-called probe tip). In the apertured probe, the scattered light is not transmitted through a portion where the light-shielding coating layer 6 is formed, and the scattered light is transmitted only at the distal end where the light-shielding coating layer 6 is not formed. That is, the fiber having the distal end exposed from an aperture portion 6a of the light-shielding coating layer 6 covering the tapered portion 5 is used as the optical fiber probe 4.

The near-field optical microscope as described above is adapted for collecting the evanescent light generated on the object by using the probe, and its mode is referred to as a collection mode.

As other modes of the near-field optical microscope, there have been known an illumination mode for providing an optical image by locally illuminating an object with an evanescent light generated at the distal end of the probe, and an illumination/collection mode for locally illuminating an object with an evanescent light generated at the distal end of the probe while detecting the light scattered at the distal end of the probe through the probe.

Meanwhile, the phenomenon of energy transfer between the object and the probe in the near-field optical microscope as described above is based on a short range interaction between the dipoles thereof. The conditions for generating an effective interaction between the object and the probe include: first, that the size of the object and the size of the probe are proximate to each other; and second, that the distance between the object and the probe is equal to or smaller than the size of the probe. The size of the probe in this case means the distal end diameter in the probe tip and the aperture diameter in the apertured probe. Therefore, the maximum resolution of the near-field optical microscope is determined by the distal end diameter or the aperture diameter of the probe.

Up to now, a technique for producing the probe tip having the conical tapered portion 5 by tapering one end of the optical fiber by chemical etching and then forming the light-shielding coating layer 6 except for the distal end of the tapered portion 5 by a vacuum evaporation method has been employed as an effective method for producing the apertured probe.

When the taper angle θ is small, the light is significantly absorbed in the metal in a region where the cross-sectional diameter of the tapered portion 5 is equal to or smaller than the wavelength, and the transmission efficiency is lowered. (It is to be noted that the dimension from the distal end portion to the position where the cross-sectional diameter equals to the wavelength λ of the light is hereinafter referred to as a tip length L.)

However, if the taper angle θ is increased (i.e., the tip length L is decreased) to enhance the transmission efficiency, the light leaks from a thin metal portion on the periphery of the aperture. Therefore, it is difficult to obtain an image with a high spatial resolution equivalent to that in the case of the small taper angle.

The light-shielding coating layer 6 provided on the surface of the tapered portion 5 is conventionally formed by a dry film forming method, such as, vacuum evaporation. However, if the light-shielding coating layer 6 of aluminum (Al) having a thickness of 120 nm is formed by vacuum evaporation, the distal end of the optical fiber is not exposed from the aluminum and is covered with the aluminum film having a thickness of 30 nm. Also, since a vacuum evaporation unit having an optical fiber rotation mechanism and a high degree of vacuum are required for carrying out vacuum evaporation, a significant reduction in production cost due to mass production of the optical fiber probes cannot be expected.

Moreover, it is known that a metal tip or a metallized dielectric tip having a thin metal film of 1 to 50 nm (of a so-called plasmon probe) has a high scattering efficiency because of the large dielectric constant of its metal, and that a strong near field is generated at the distal end of the tip on the basis of the near field enhancement effect of the plasmon excited on the metal surface at the time of optical irradiation. However, it is difficult to use such probe in the illumination mode because of its insufficient light shielding ability.

Meanwhile, the near-field optical microscope using a light as a medium is capable of carrying out local measurement of the wavelength spectrum as well as measurement of the shape of the sample.

For example, in the case where near-field optical spectroscopic study of a semiconductor device is to be carried out, it is simple and effective to employ the illumination/collection mode for performing both optical irradiation and optical detection with the optical fiber probe. However, since the conventional optical fiber probe has a low transmittance, a low illumination efficiency in illumination (or lighting), and a low collection efficiency in collection (or light condensation), actual measurement is difficult with the conventional optical fiber probe. In addition, since the conventional optical fiber probe has the core made of quartz ($SiO_2$) doped with germanium dioxide ($GeO_2$) having a low transmittance of ultraviolet rays because of absorption at 350 nm, the conventional optical fiber probe cannot be used for ultraviolet rays.

Thus, in view of the foregoing status of the art, it is an object of the present invention to provide an optical fiber probe which ensures a sufficient light transmission efficiency and enables miniaturization of the aperture diameter, and a manufacturing method therefor.

It is another object of the present invention to provide an optical fiber probe which enables easy formation of a light-shielding coating layer having a minute aperture in a tapered portion of an optical fiber and has an excellent resolution, and a manufacturing method therefor which enables improvement in productivity.

It is still another object of the present invention to provide an optical fiber probe which is excellent in both resolution capability and scattering efficiency, and a manufacturing method therefor.

It is still another object of the present invention to provide an optical fiber probe having excellent transmittance of ultraviolet rays, and a manufacturing method therefor.

It is a further object of the present invention to provide an optical fiber probe which enables propagation of both an excitation light and a detection light generated from a sample, and a manufacturing method therefor.

DISCLOSURE OF THE INVENTION

According to the present invention, there is provided an optical fiber probe including an optical fiber having a cladding provided around a core. The optical fiber has, at one end thereof, a tapered portion inclined in three stages having three inclinations.

In this optical fiber probe, the inclination of the second stage from a distal end of the tapered portion is, for example, 30 to 90°, and the inclinations of the first stage and the third stage from the distal end are smaller than the inclination of the second stage. Also, in this optical fiber probe, the bottom diameter of a taper surface of the first stage from the distal end of the tapered portion is equal to or smaller than the wavelength of a propagated light.

In addition, this optical fiber probe, the tapered portion is provided at one end of the optical fiber having a cladding made of quartz ($SiO_2$) doped with fluorine (F) around a core made of quartz doped with OH or pure quartz ($SiO_2$).

Also, this optical fiber probe has a light-shielding coating layer formed on the surface of the tapered portion except for a portion on the periphery of the distal end of the tapered portion, and the distal end portion of the tapered portion is exposed from the light-shielding coating layer through an aperture portion.

In addition, this optical fiber probe has a light-shielding coating layer formed on the surface of the tapered portion except for a portion on the periphery of the distal end of the tapered portion, and the distal end portion of the tapered portion is protruding from the light-shielding coating layer through an aperture portion.

Moreover, in this optical fiber probe, the light-shielding coating layer is formed on the surface of the tapered portion by vacuum evaporation and chemical etching.

Also, this optical fiber probe has a light-shielding coating layer formed on the surface of the tapered portion except for a portion on the periphery of the distal end of the tapered portion by electroless plating, and the distal end portion of the tapered portion is protruding from the light-shielding coating layer through an aperture portion.

In addition, in this optical fiber probe, the light-shielding coating layer is formed with a uniform thickness up to a halfway portion of the tapered portion, with the thickness decreasing from the halfway portion to a position where the thickness corresponds to the aperture diameter of the aperture portion.

Also, in this optical fiber probe, a first metal layer, a dielectric layer and a second metal layer are formed on the surface of the tapered portion.

Moreover, in this optical fiber probe, the dielectric layer has a refractive index n lower than the refractive index n of the tapered portion.

In addition, in this optical fiber probe, the first metal layer, the dielectric layer and the second metal layer have thicknesses smaller at the distal end of the tapered portion than in other regions.

Also, in this optical fiber probe, the first metal layer has a thickness of 1 to 50 nm and the second metal layer has a thickness of 100 nm or greater in the regions other than the distal end of the tapered portion. The first metal layer is formed except for the distal end portion.

According to the present invention, there is also provided an optical fiber probe including an optical fiber having a first cladding and a second cladding provided around a core. The optical fiber probe has a tapered portion inclined in three stages having three inclinations which is formed by tapering the core and the first cladding protruding from a terminal of the second clad. The core is adapted for propagating a light of a single guided mode, and the first cladding is adapted for propagating a light of plural guided modes.

According to the present invention, there is also provided a manufacturing method for an optical fiber probe including the steps of carrying out etching on one end of an optical fiber having a second core, a first cladding and a second cladding formed in this order around a first core, in which a radius $r_4$ of an outer peripheral surface of the second cladding is $r_4 \leq r_{4P}$, where $r_{4P} = r_3 + (r_3 - r_2)[(R_2 + R_3)/(R_3 - R_2)]^{1/2}$ $r_2$: radius of the outer peripheral surface of the second core $r_3$: radius of the outer peripheral surface of the first cladding $R_2$: dissolution rate of the second core $R_3$: dissolution rate of the first cladding under the condition of $R_1 = R_2 < R_3 < R_4$ $R_1$: dissolution rate of the first core $R_2$: dissolution rate of the second core $R_3$: dissolution rate of the first cladding $R_4$: dissolution rate of the second cladding, and then performing chemical etching under the condition of $R_1 < R_2 < R_3 < R_4$ so as to form a tapered portion inclined in three stages having three inclinations.

In this manufacturing method for an optical fiber probe, after the tapered portion inclined in three stages having three inclinations is formed at one end of the optical fiber, a light-shielding coating layer is further formed except for the distal end of the tapered portion by vacuum evaporation and etching.

Also, tin this manufacturing method for an optical fiber probe, after the tapered portion inclined in three stages having three inclinations is formed at one end of the optical fiber, a light-shielding coating layer is further formed except for the distal end of the tapered portion by electroless plating.

According to the present invention, there is also provided a manufacturing method for an optical fiber, probe including a cladding inclination step of forming an inclined portion inclined from the outer periphery to the inner periphery at one end of a cladding of an optical fiber which has the cladding provided around a core, a first tapering step of causing one end of the core to protrude from the cladding and conically tapering the one end by chemical etching, and a second tapering step of inclining the conically tapered one end of the core into two stages having two inclinations by chemical etching.

In this manufacturing method for an optical fiber probe, in the cladding inclination step, the inclined portion is formed at one end of the cladding by melting and drawing the optical fiber.

Also, in this manufacturing method for an optical fiber probe, in the first tapering step, chemical etching is carried out under the condition satisfying $R_{12} < R_{22}$ where $R_{12}$ represents the etching rate of the core and $R_{22}$ represents the etching rate of the cladding.

In addition, in this manufacturing method for an optical fiber probe, in the second tapering step, chemical etching is carried out under the condition satisfying $R_{13} > R_{23}$ where $R_{13}$ represents the etching rate of the core and $R_{23}$ represents the etching rate of the cladding.

Moreover, in this manufacturing method for an optical fiber probe, after the second tapering step, a light-shielding coating layer is formed at one end of the tapered optical fiber except for the distal end portion of the core.

According to the present invention, there is also provided a manufacturing method for an optical fiber probe including a cladding inclination step of forming an inclined portion inclined from the outer periphery to the inner periphery at one end of a first cladding of an optical fiber which has the first cladding and a second cladding provided around a core, a first tapering step of causing one end of the core to protrude from the first cladding and conically tapering the one end by chemical etching, and a second tapering step of inclining the conically tapered one end of the core into two stages having two inclinations by chemical etching.

In this manufacturing method for an optical fiber probe, in the cladding inclination step, chemical etching is carried out under the condition satisfying $R_{11} = R_{21} < R_{31}$ where $R_{11}$ represents the etching rate of the core, $R_{21}$ represents the etching rate of the first cladding, and $R_{31}$ represents the etching rate of the second cladding.

Also, in this manufacturing method for an optical fiber probe, in the first tapering step, chemical etching is carried out under the condition satisfying $R_{12} < R_{22} < R_{32}$ where $R_{12}$ represents the etching rate of the core, $R_{22}$ represents the etching rate of the cladding, and $R_{32}$ represents the etching rate of the second cladding.

In addition, in this manufacturing method for an optical fiber probe, in the second tapering step, chemical etching is carried out under the condition satisfying $R_{13} > R_{23} < R_{33}$ where $R_{13}$ represents the etching rate of the core, $R_{23}$ represents the etching rate of the cladding, and $R_{33}$ represents the etching rate of the second cladding.

Moreover, in this manufacturing method for an optical fiber probe, after the second tapering step, a light-shielding coating layer is formed at one end of the tapered optical fiber.

According to the present invention, there is further provided a manufacturing method for an optical fiber probe including a cladding inclination step of forming an inclined portion inclined from the outer periphery to the inner periphery at one end of a cladding of an optical fiber which has a second core and the cladding provided around a first core, and a tapering step of causing one end of the first core and one end of the second core to protrude from the cladding and inclining the one end of the first core and the one end of the second core into two stages having two inclinations by chemical etching.

In this manufacturing method for an optical fiber probe, in the cladding inclination step, the inclined portion is formed at one end of the cladding by melting and drawing the optical fiber.

Also, in this manufacturing method for an optical fiber probe, in the tapering step, chemical etching is carried out under the condition satisfying $R_{12} < R_{22} < R_{32}$ where $R_{12}$ represents the etching rate of the first core, $R_{22}$ represents the etching rate of the second core, and $R_{32}$ represents the etching rate of the cladding.

In addition, in this manufacturing method for an optical fiber probe, the one end of the first core is inclined in two stages having two inclinations by carrying out, after the tapering step, chemical etching under the condition satisfying $R_{13} > R_{23} < R_{33}$ where $R_{13}$ represents the etching rate of the first core, $R_{23}$ represents the etching rate of the second core, and $R_{33}$ represents the etching rate of the cladding.

Moreover, in this manufacturing method for an optical fiber probe, after the tapering step, a light-shielding coating layer is formed at one end of the tapered optical fiber.

BRIEF DESCRIPTION OF THE DRAWINGS

FIG. 12A is a cross-sectional view showing the light-shielding coating layer before etching. FIG. 12B is a cross-sectional view showing a state that the distal end portion of the optical fiber is exposed from the light-shielding coating layer by etching. FIG. 12C is a cross-sectional view showing a state that the distal end portion of the optical fiber is caused to protrude from the light-shielding coating layer by etching.

BEST MODE FOR CARRYING OUT THE INVENTION

Preferred embodiments of the present invention will now be described in detail with reference to the drawings.

An optical fiber probe according to the present invention is used for a near-field optical microscope which provides an optical image by exciting an evanescent light on an object and detecting a scattered light of the evanescent light.

In the near-field optical microscope of illumination mode, this optical fiber probe functions as an illumination unit for illuminating the object in a range of wavelength smaller than the wavelength of light, that is, as an illumination unit of the evanescent light. On the other hand, in the near-field optical microscope of collection mode, the optical fiber probe functions as a scattere for scattering the evanescent light excited on the object and also functions as a waveguide for guiding the scattered light to a detector. In the illumination/collection mode, the optical fiber probe functions both as the illumination unit and as the scattere.

Figure 1:
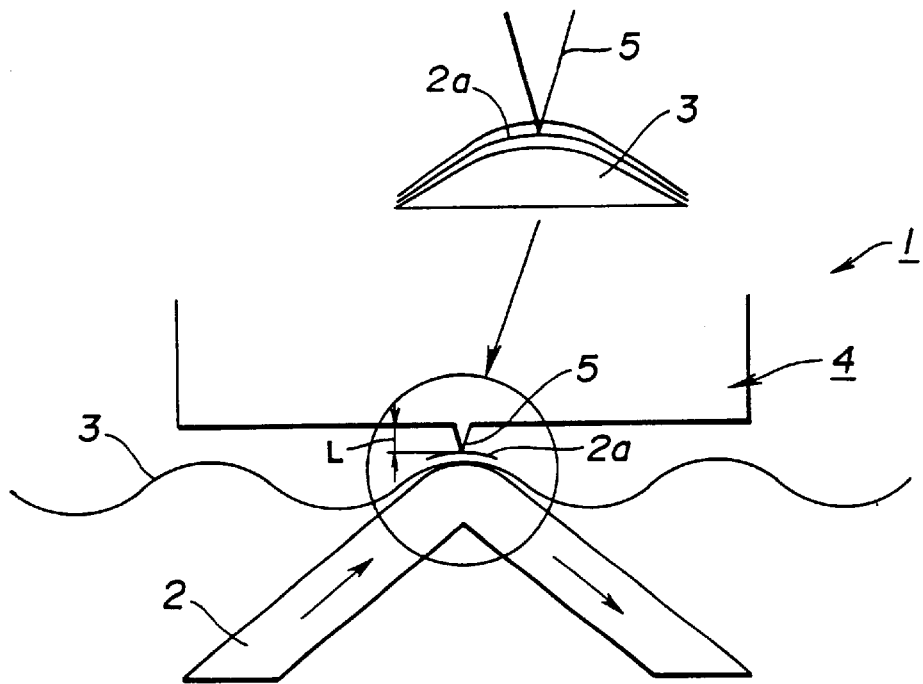
FIG. 1 is a schematic view showing the principle of a near-field optical microscope.
Figure 2:
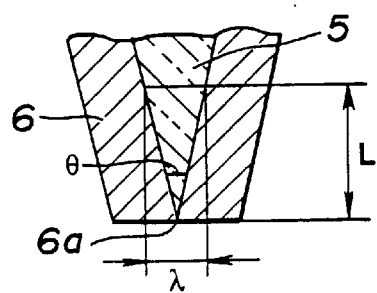
FIG. 2 is a cross-sectional view showing an apertured probe manufactured by a conventional manufacturing method.
Figure 3:
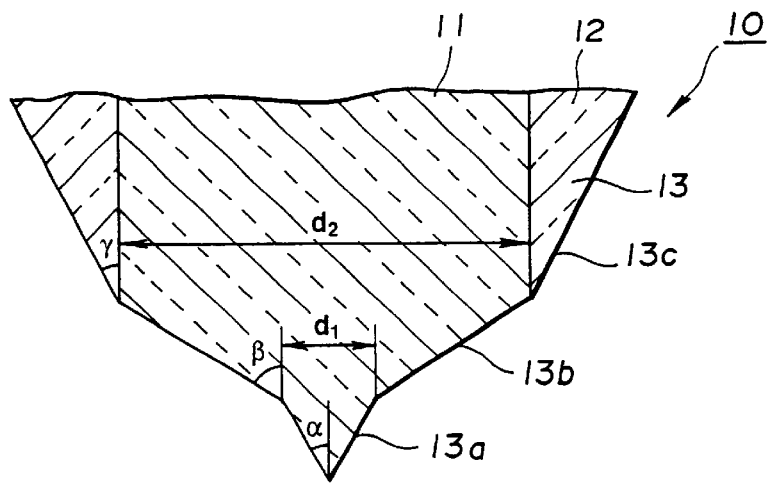
FIG. 3 is a cross-sectional view showing an example of the distal end shape of an optical fiber probe according to the present invention.
Figure 4:
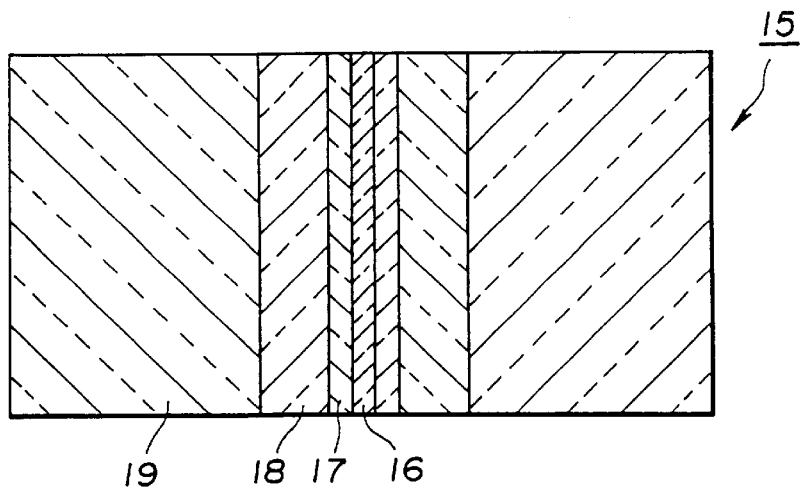
FIG. 4 is a cross-sectional view showing essential portions of an optical fiber of a fourfold structure.

The optical fiber probe according to the present invention has a structure as shown in FIG. 3, for example. That is, this optical fiber probe 10 is made of an optical fiber having a cladding 12 formed around a core 11. At one end of the optical fiber probe 10, a tapered portion 13 inclined in three stages having three inclinations is formed. The surfaces having inclinations α, β and γ of the tapered portion 13 are hereinafter referred to as a first taper surface 13a, a second taper surface 13b and a third taper surface 13c from the distal end.

In the tapered portion 13 of the optical fiber probe 10 thus inclined in three stages having three inclinations, the effective aperture diameter is miniaturized by decreasing the inclination α of the first taper surface 13a, so as to improve the resolution. In this case, if the tapered portion is conically tapered with one inclination, as this inclination is decreased, the loss of light is increased and the transmission efficiency is lowered. On the contrary, with respect to the tapered portion 13 inclined in three stages having three inclinations, the optical transmission efficiency may be improved by increasing the inclination β of the second taper surface 13b or adjusting the inclination γ of the third taper surface 13c even when the inclination α of the first taper surface 13a is decreased. That is, in this optical fiber probe 10, the resolution may be enhanced while a sufficient optical transmission efficiency is provided. In order to obtain such effect, it is preferred that the inclination β of the second taper surface 13b is 30 to 90° and that the inclination a of the first taper surface 13a and the inclination γ of the third taper surface 13c are smaller than the inclination β.

More preferably, the inclinations and outer diameters of the first taper surface 13 a, the second taper surface 13b and the third taper surface 13c are set in the following range.

First, it is preferred that the inclination β of the second taper surface 13b is 30 to 90° as described above. It is also preferred that the bottom diameter $d_2$ of the second taper surface 13b is equal to or greater than the wavelength of a propagated light.

It is preferred that the first inclination α of the first taper surface 13a is equal to or smaller than 30°. It is also preferred that the bottom diameter $d_1$ of the first taper surface 13a is equal to or smaller than the bottom diameter $d_2$ of the second taper surface 13b and equal to or smaller than the wavelength of the propagated light, for example, approximately 50 to 100 nm.

In addition, it is preferred that the inclination γ of the third taper surface 13c is 10 to 30°.

Then, a manufacturing method for the optical fiber probe 10 having the tapered portion 13 inclined in three stages having three inclinations will be explained with reference to the case where the optical fiber probe 10 is manufactured using an optical fiber 15 of a fourfold structure having a second core 17, a first cladding 18 and a second cladding 19 provided around a first core 16 in this order.

Tapering of this optical fiber 15 is carried out by, for example, chemical etching.

Figure 5:
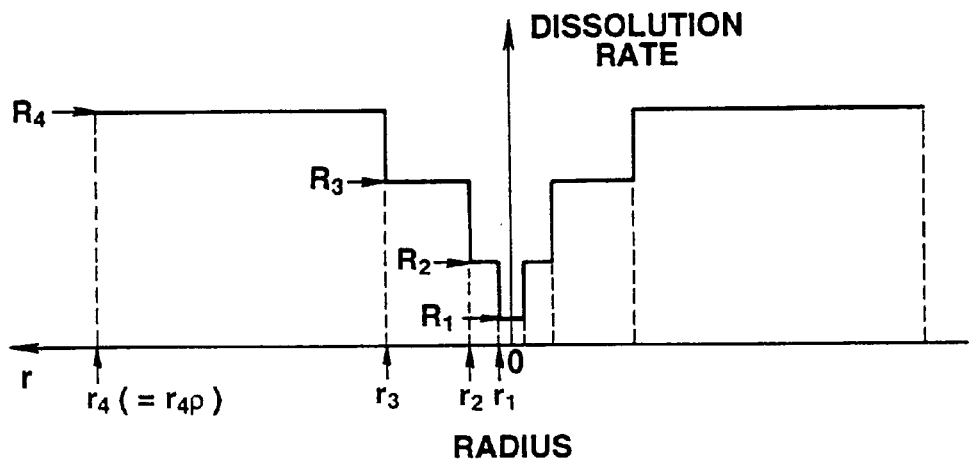
FIG. 5 is a schematic view showing dissolution rate distribution of the optical fiber.

To taper one end of the optical fiber 15 with three inclinations by chemical etching, each of the layers forming the optical fiber 15 must be selected in such a manner as to satisfy the condition of $R_1<R_2<R_3<R_4$, where $R_1$ represents the dissolution rate of the first core 16, $R_2$ represents the dissolution rate of the second core 17, $R_3$ represents the dissolution rate of the first cladding 18, and $R_4$ represents the dissolution rate of the second cladding 19, in the etching solution. The dissolution rate distribution thereof is shown in the graph of FIG. 5. In FIG. 5, the abscissa expresses the radius of the outer peripheral surface of each layer.

Specifically, $r_1$ represents the radius of the outer peripheral surface of the first core 16, $r_2$ represents the radius of the outer peripheral surface of the second core 17, $r_3$ represents the radius of the outer peripheral surface of the first cladding 18, and $r_4$ represents the radius of the outer peripheral surface of the second cladding 19. The ordinate expresses the dissolution rate in the corresponding range.

The dissolution rate in the etching solution is determined by the composition of the etching solution and the material of each layer forming the optical fiber 15.

Specific examples of the materials of the optical fiber 15 are provided as follows.

| | |
|---|---|
| first core | quartz ($SiO_2$) doped with germanium dioxide ($GeO_2$) dissolution rate: $R_1$ radius of outer peripheral surface: $r_1$ |
| second core | pure quartz ($SiO_2$) dissolution rate: $R_2$ radius of outer peripheral surface: $r_2$ |
| first cladding | quartz ($SiO_2$) doped with low-density fluorine (F) dissolution rate: $R_3$ radius of outer peripheral surface: $r_3$ |
| second cladding | quartz ($SiO_2$) doped with high-density fluorine (F) dissolution rate: $R_4$ radius of outer peripheral surface: $r_4$ |

In such optical fiber 15 of the fourfold structure, chemical etching is carried out so as to form the first taper surface 13a on the first core 16, to form the second taper surface 13b on the second core 17, and to form the third taper surface 13c on the first cladding 18. The second cladding 19 is a support layer for forming the third taper surface 13c.

The outermost layer of the optical fiber probe 10 ultimately provided in this manner is determined by a parameter $r_{4P}$, which holds the following relation.

$$r_{4P}=r_3+(r_3-r_2)[(R_2+R_3)/(R_3-R_2)]^{1/2}$$

That is, if the parameter $r_{4P}$ and the radius $r_4$ of the outer peripheral surface of the second cladding 19 are equal to each other ($r_4=r_{4P}$), the second cladding layer is completely removed at the time point when the third taper surface 13c is formed by chemical etching. If $r_4>r_{4P}$, the second cladding layer remains even at the time point when the third taper surface 13c is formed. On the other hand, if $r_4<r_{4P}$, the radius of the outer peripheral surface of the first cladding 18 is smaller than the initial radius $r_3$ at the time point when the third taper surface 13c is formed.

To obtain the optical fiber probe 10 having a desired shape (α, β, γ, $d_1$, $d_2$), it is necessary to conduct accurate designing of materials corresponding to the relative refractive index difference (i.e., so-called fiber type) of the optical fiber 15 and the relative refractive index difference distribution thereof, on the basis of the correlation between the geometrical model of selective chemical etching of the fourfold-structure optical fiber 15, the dissolution rate in the etching solution and the relative refractive index difference.

Figure 6:
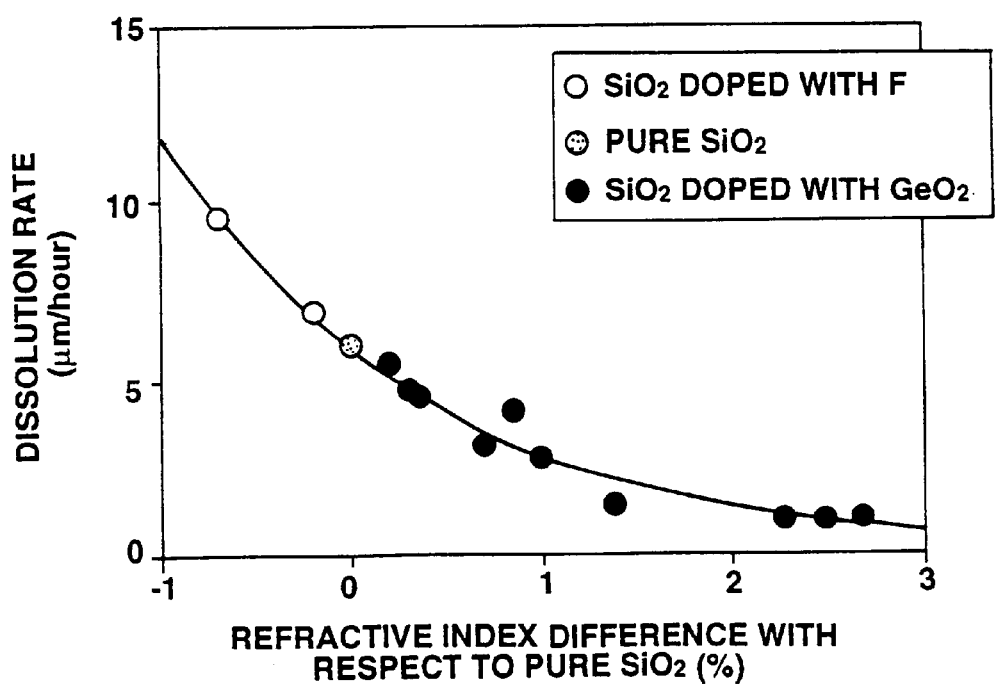
FIG. 6 is a graph showing the relation between the relative refractive index difference from pure quartz ($SiO_2$) and the dissolution rate in a buffer HF solution containing 40 wt % of $NH_4F$ solution: 50 wt % of HF acid: $H_2O$ at a volumetric ratio of 10:1:1, with respect to quartz ($SiO_2$) doped with fluorine (F), pure quartz ($SiO_2$), and quartz ($SiO_2$) doped with germanium dioxide ($GeO_2$).

FIG. 6 shows the relation between the relative refractive index difference from pure $SiO_2$ and the dissolution rate in the etching solution, with respect to $SiO_2$ doped with $GeO_2$ and $SiO_2$ doped with F. The etching solution is a buffer hydrogen fluoride (HF) solution containing 40 wt % of $NH_4F$ solution: 50 wt % of HF acid: $H_2O$ at a volumetric ratio of 10:1:1.

Figure 7:
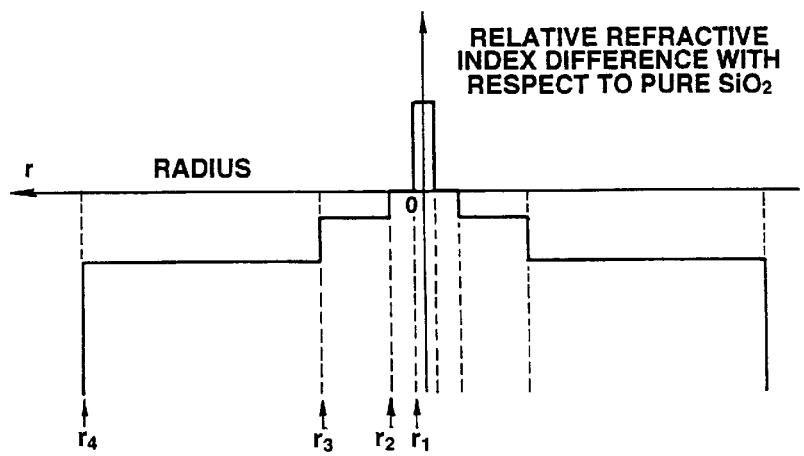
FIG. 7 is a schematic view showing refractive index distribution of the optical fiber having the dissolution rate distribution shown in FIG. 5.

To obtain the dissolution rate distribution as shown in FIG. 5 on the basis of this relation, the optical fiber 15 having the relative refractive index difference distribution as shown in FIG. 7 must be designed. In FIGS. 5 and 7, $r_1$, $r_2$, $r_3$ and $r_4$ represent the radius of the first core 16, the radius of the second core 17, the radius of the first cladding 18 and the radius of the second cladding 19, respectively.

Figure 8:
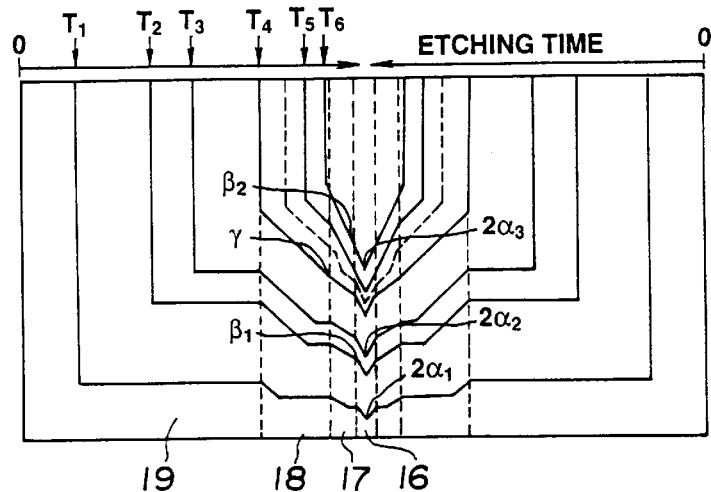
FIG. 8 is a schematic view showing progress of etching of a fourfold-structure fiber having the dissolution rate distribution of $R_1<R_2<R_3<R_4$.

The geometrical model of selective chemical etching as shown in FIG. 8 of the optical fiber 15 having the dissolution rate distribution shown in FIG. 5 will now be considered. In FIG. 8, is it assumed that $r_4=r_{4P}$. In this case, it is found that the optical fiber 15 takes various shapes according to various etching times ($T_1$, $T_2$, $T_3$, $T_4$, $T_5$, $T_6$).

At this point, the following relations are provided.

$T_1=[r_1/R_1][(R_1+R_2)/(R_2-R_1)]^{1/2}$ $T_2=[(r_2-r_1)/R_2][(R_2+R_3)(R_3-R_2)]^{1/2}$ $T_3=T_2+[r_1/R_1][(R_1+R_3)(R_3-R_1)]^{1/2}$ $T_4 = [(r_3-r_2)/R_3][(R_3+R_4)/(R_4-R_3)]^{1/2}$
$\sin(\alpha_1) = R_1/R_2$
$\sin(\alpha_2) = R_1/R_3$
$\sin(\alpha_3) = R_1/R_4$
$\sin(\beta_1) = R_2/R_3$
$\sin(\beta_2) = R_2/R_4$
$\sin(\gamma) = R_3/R_4$ In the case where $r_4 = r_{4P}$, when the etching time is $T_4$, the optical fiber probe 10 having the distal end portion tapered with three inclinations ($\alpha = \alpha_2$, $\beta = \beta_1$, $\gamma$) is provided. In this case, the outer diameter of the optical fiber probe 10 is twice $r_3$.

Figure 9:
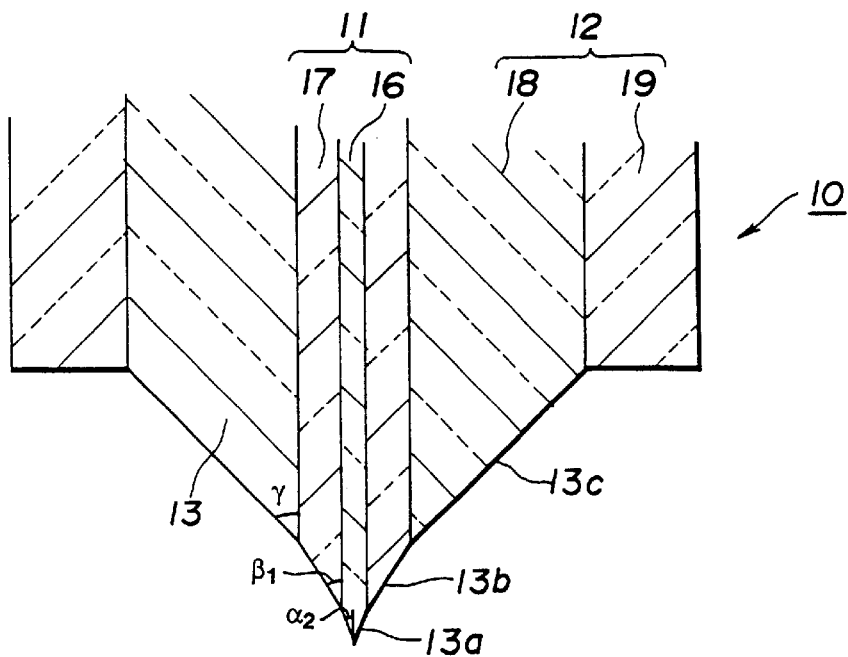
FIG. 9 is a cross-sectional view showing another example of the distal end shape of the optical fiber probe according to the present invention.

If $r_4 > r_{4P}$, when the etching time is $T_4$, the optical fiber probe 10 having the second cladding 18 and the tapered portion 13 inclined in three stages having three inclinations $\alpha$, $\beta$, $\gamma$ as shown in FIG. 9 is provided. In this optical fiber probe 10, a multimode light wave may be propagated within the first cladding 18 covered with the second cladding 19.

By ending the chemical etching in a shorter time than $T_4$, the optical fiber probe 10 having the tapered portion 13 inclined in three stages having three inclinations $\alpha$, $\beta$, $\gamma$ with the second cladding 19 remaining thereon, as shown in FIG. 9, is provided.

When the first core 16, the second core 17, and the first and second claddings 18, 19 are made of $SiO_2$ doped with $GeO_2$, pure $SiO_2$, and $SiO_2$ doped with F, respectively, a buffer HF solution containing 40 wt % of $NH_4F$ solution: 50 wt % of HF acid: $H_2O$ at a volumetric ratio of X:1:1 (X>1.7) is used as the etching solution. In the etching using this buffer HF solution, the taper angle $2\alpha$ of the first core 16 may be controlled by changing the volumetric ratio X of the $NH_4F$ solution.

However, if the buffer HF solution containing the $NH_4F$ solution at a high ratio, such as, X=10, is used, the dissolution rate is lowered. Therefore, in order to shorten the etching time, it is preferred, first, to taper the first cladding 18 and the second core 17 with a buffer HF solution containing the $NH_4F$ solution at a ratio of X=1.7, and then to taper the first core 16 with a buffer HF solution containing the $NH_4F$ solution at a ratio of X>1.7. It is to be noted that since the dissolution rate of $SiO_2$ doped with $GeO_2$ is equal to the dissolution rate of pure $SiO_2$ in the buffer HF solution of X=1.7, the dissolution rate of each layer forming the optical fiber 15 is expressed as $R_1 = R_2 < R_3 < R_4$.

Tapering with the buffer HF solution was actually carried out with respect to the optical fiber 15 of the fourfold structure made of the following materials:

| | |
|---|---|
| first core | $SiO_2$ doped with $GeO_2$ |
| | relative refractive index difference with respect to pure $SiO_2$: 0.8% core diameter $2r_1$: 100 nm |
| second core | pure $SiO_2$ |
| | relative refractive index difference with respect to pure $SiO_2$: 0% core diameter $2r_2$: 1 μm |
| first cladding | $SiO_2$ doped with low-density F |
| | relative refractive index difference with respect to pure $SiO_2$: −0.35% |
| | cladding diameter $2r_3$: 30 μm |
| second cladding | $SiO_2$ doped with high-density F |
| | relative refractive index difference with respect to pure $SiO_2$: −0.7% cladding diameter $2r_4$: 125 μm | in the following two steps:
  etching at a dissolution rate of $R_1 = R_2 < R_3 < R_4$
    composition of buffer HF solution:
      40 wt % of $NH_4F$ solution: 50 wt % of HF acid: $H_2O$=1.7:1:1 (volumetric ratio)
      solution temperature: 25° C.
      processing time: 35 minutes
    etching at a dissolution rate of $R_1 = R_2 < R_3 < R_4$
      composition of buffer HF solution:
        40 wt % of $NH_4F$ solution: 50 wt % of HF acid: $H_2O$ =10:1:1 (volumetric ratio)
        solution temperature: 25° C.
        processing time: 50 minutes As a result of the tapering processing as described above, the distal end of the optical fiber 15 was tapered with three inclinations $\alpha$, $\beta$ and $\gamma$. Specific dimensions were obtained as follows.

| | |
|---|---|
| First taper surface | angle $2\alpha$: 45° |
| | bottom diameter $d_1$: 0.1 μm |
| Second taper surface | angle $2\beta$: 120° |
| | bottom diameter $d_2$: 1 μm |
| Third taper surface | angle $2\gamma$: 98° |

As the optical fiber for manufacturing the optical fiber probe 10, an optical fiber of a fivefold structure including a first core, a second core, a first cladding, a second cladding and a third cladding may be used in place of the optical fiber 15 of the fourfold structure.

In such optical fiber of the fivefold structure, the third cladding may be made of pure $SiO_2$ or $SiO_2$ doped with low-density F. In the case of the optical fiber of the fivefold structure having the second core and the third cladding made of pure $SiO_2$, in order to determine the radius $r_5$ of the third cladding, a parameter $r_{5P}$ must be found similarly to $r_{4P}$ of the optical fiber of the fourfold structure. In this case, since the dissolution rate $R_5$ of the third cladding is equal to $R_2$, $r_{5P}$ may be expressed as follows.

$r_{5P} = (r_{4P} - r_4)(R_2/R_4)$

If $r_{5P} = r_5$, when the etching time is $T_4$, the optical fiber probe 10 having the tapered portion inclined with three inclinations ($\alpha = \alpha_2$, $\beta = \beta_1$, $\gamma$) is provided. The outer diameter of the optical fiber probe 10 is twice $r_3$.

If $r_{5P} > r_5$, the third cladding layer remains even at the time point when the third taper surface $3c$ is formed. If $r_{5P} < r_5$, the radius of the outer peripheral surface of the second cladding is smaller than the initial radius $r_3$ at the time point when the third taper surface $3c$ is formed.

In the optical fiber of the fivefold structure, too, various tapered shapes may be provided by controlling the dimensional design and etching conditions based on $r_{5P}$ and $r_{4P}$. However, the third cladding must be completely removed at the time point when the third taper surface $3c$ is formed, and $r_5$ must be set to satisfy the condition of $r_5 < r_{5P}$.

The basic structure of the optical fiber probe is described above. In this optical fiber probe, the surface of the tapered portion may be substantially covered with a light-shielding coating layer having a minute aperture at the distal end of the tapered portion.

Figure 10:
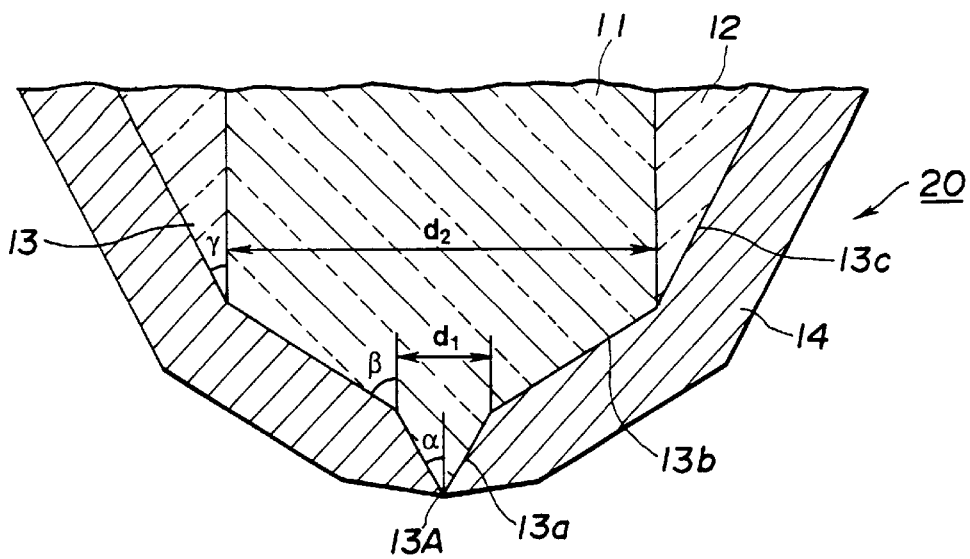
FIG. 10 is a cross-sectional view showing an example of an optical fiber probe having a light-shielding coating layer formed on a distal end portion thereof.
Figure 11:
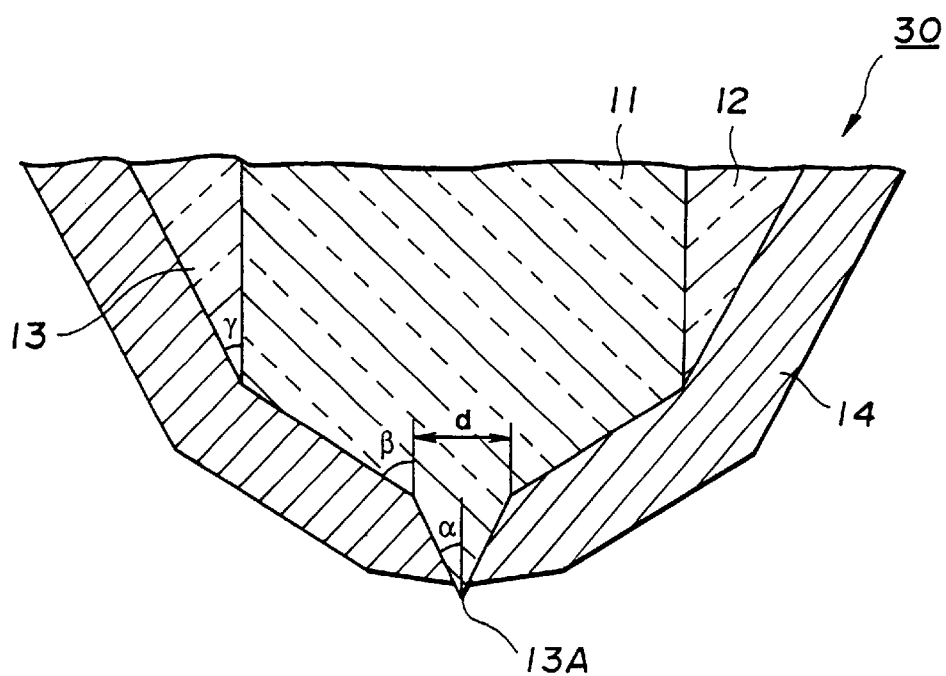
FIG. 11 is a cross-sectional view showing another example of the optical fiber probe having a light-shielding coating layer formed on a distal end portion thereof.

The apertured probe having such light-shielding coating layer has a function to restrain a propagated light which causes deterioration in resolution. To obtain an image having a high resolution, it is essential that a distal end 13A is exposed or protruding from an aperture portion of a light-shielding coating layer 14 as in an optical fiber probe 20 shown in FIG. 10 or an optical fiber probe 30 shown in FIG. 11.

By thus forming the light-shielding coating layer 14, incidence of a light is disturbed in a portion where the light-shielding coating layer 14 is formed, and the light is selectively incident only in a portion of the minute aperture portion or a portion where the thickness of the light-shielding coating layer 14 is reduced. Therefore, the resolution is increased. For the light-shielding coating layer 14, it is preferred to use metal materials, such as, aluminum (Al), gold (Au), silver (Ag) and platinum (Pt).

The light-shielding coating layer 14 may be formed by a vacuum evaporation method or an electroless plating method.

The vacuum evaporation method is a method for forming a thin film by heat-evaporating an evaporation source and depositing the vapor thereof onto a processing surface.

Figure 12A:
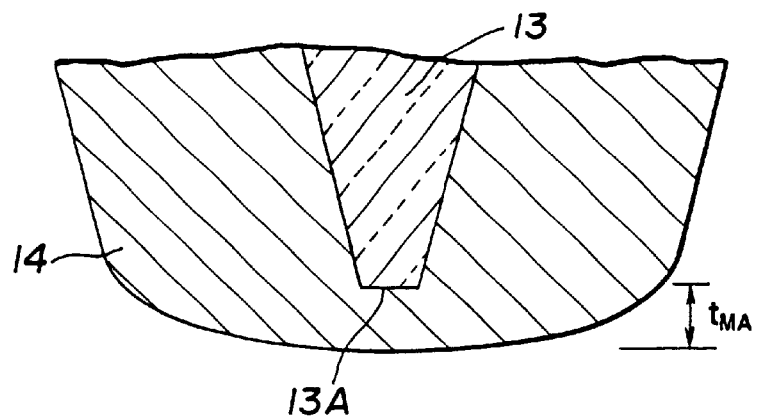
FIGS. 12A to 12C show an etching process of the light-shielding coating layer.

In this vacuum evaporation method, a light-shielding coating material is heat-evaporated toward the fiber lateral surface while the optical fiber 15 is rotated in a high vacuum, thus forming the light-shielding coating layer 14. For the light-shielding coating layer 14, it is preferred to use metals, such as, aluminum (Al), gold (Au), silver (Ag) and platinum (Pt). In order to improve the adhesiveness of the light-shielding coating layer 14 to the optical fiber 15, a buffer layer of chromium (Cr) or the like having a thickness of 5 nm may be formed by vacuum evaporation before the light-shielding coating layer 14 is formed. In addition, by the vacuum evaporation method consisting only of the evaporation step, an optical fiber probe having the distal end 13A covered with a thin light-shielding coating layer 14 having a thickness t., for providing a sneak path for evaporated particles, as shown in FIG. 12A, is provided.

In the optical fiber probe having the tapered portion 13 inclined in three stages having three inclinations, as aluminum (Al) was actually evaporated on the tapered portion 13 to form the light-shielding coating layer 14 having an average thickness of about 250 nm, a minute aperture portion could be formed at the distal end 13A of the tapered portion 13.

Figure 12B:
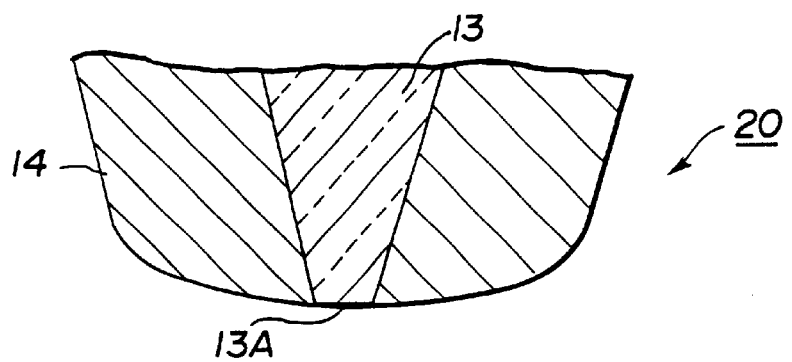
Figure 12C:
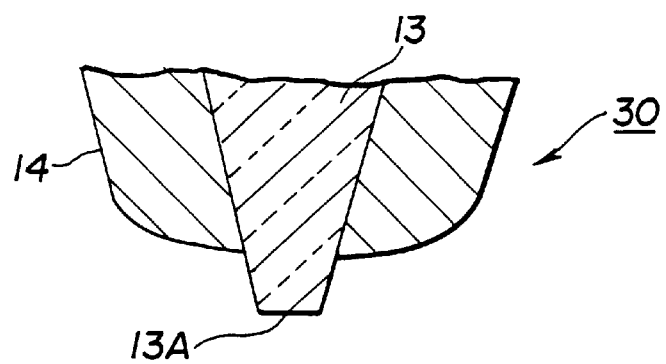

However, in order to obtain a near-field optical image having a high resolution, the optical fiber probe 20 with its distal end 13A exposed from the light-shielding coating layer 14 as shown in FIG. 12B or the optical fiber probe 30 with its distal end 13A protruding from the light-shielding coating layer 14 as shown in FIG. 12C is required. The method of forming the light-shielding coating layer 14 for producing these optical fiber probes is exemplified by a method including vacuum evaporation and chemical etching, and an electroless plating method.

In the method including vacuum evaporation and chemical etching, similar to the above-described evaporation method, the light-shielding coating layer 14 is formed by heat-evaporating the light-shielding coating material toward the fiber lateral surface while rotating the optical fiber in a high vacuum. In this case, in order to improve the adhesiveness of the light-shielding coating layer 14 to the optical fiber 15, a buffer layer of chromium (Cr) or the like having a thickness of 5 nm may be formed by vacuum evaporation before the light-shielding coating layer 14 is formed. Then, an anticorrosive coating film is formed on the optical fiber coated with the light-shielding coating layer, except for the distal end portion thereof. This anticorrosive coating film is formed by heat-evaporating an anticorrosive coating material toward the fiber lateral surface while rotating the optical fiber in a high vacuum. Finally, the optical fiber 15 having the light-shielding coating layer 14 and the anticorrosive coating layer is impregnated with an etching solution which dissolves the light-shielding coating layer 14 but does not dissolve the anticorrosive coating layer. Thus, the light-shielding coating layer 14 exposed from the anticorrosive coating layer is selectively chemically etched, so as to provide the optical fiber probe 20 having the distal end 13A exposed from the light-shielding coating layer 14, as shown in FIG. 12B. In addition, by controlling the etching processing time, the optical fiber probe 30 having the distal end 13A protruding from the light-shielding coating layer 14, as shown in FIG. 12C, may be provided.

On the other hand, in the electroless plating method, using a solution (electroless plating solution) in which a metal salt and a reducing agent for depositing a plating film and a complexing agent, a buffer agent and a stabilizer for depositing a metal film at a constant rate are dissolved, a metal plating film is precipitated on a processing surface by oxidation reduction between metal ions and the reducing agent.

To form the light-shielding coating layer 14 by this electroless plating method, first, catalytic metal nuclei of palladium (Pd) or the like are precipitated on the surface of the tapered portion 13, thus carrying out activation.

Then, a plating film of nickel (Ni) or the like is formed with the electroless plating solution on the activated surface of the tapered portion 13. Since the plating film is less likely to be formed on the distal end 13A of the tapered portion 13, the plating film is formed in a state that the distal end 13A of the tapered portion 13 is exposed.

In the optical fiber probe 20 thus manufactured, 90% of the area of the core is made of pure quartz ($SiO_2$) having a high transmittance in a near ultraviolet range. Therefore, with a near-field optical microscope using this probe, high-resolution image measurement in the ultraviolet range, ultraviolet spectral analysis, high-density optical recording, and hyperfine processing may be carried out.

Thus, since the optical fiber probes 20 and 30 according to the present invention have, at one end thereof, the tapered portion 13 inclined in three stages having three inclinations $\alpha$, $\beta$ and $\gamma$, the aperture diameter may be miniaturized while a sufficiently high transmission efficiency is obtained. Therefore, with the near-field optical microscope using such optical fiber probes 20, 30, an optical image having a high spatial resolution may be provided. In addition, the tapered shape of the optical fiber probes 20, 30 may be easily formed by controlling the etching rate of the core and the cladding on the basis of the selective chemical etching.

A specific example of the optical fiber probe 30 according to the present invention will now be described on the basis of experiment results.

In this specific example, bubbling with nitrogen (N) was carried out before plating so as to purge a part of oxygen dissolved in a nickel (Ni) plating solution, and bubbling with nitrogen was carried out also during plating so as to precipitate a Ni plating film to be the light-shielding coating layer 14 on the tapered portion 13 of the optical fiber.

Figure 13:
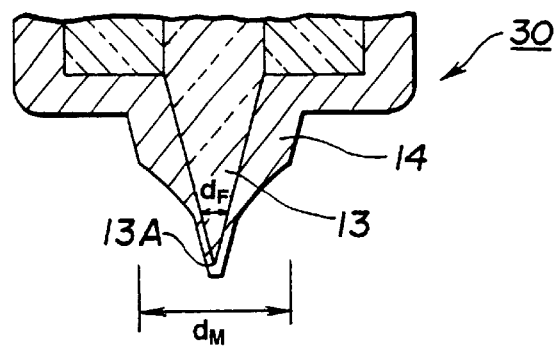
FIG. 13 is a cross-sectional view showing a plating process in the case where nitrogen bubbling is carried out in a plating solution before and during plating.

As a result, after 50 minutes from the start of plating, the Ni plating film was uniformly precipitated in a region away from the distal end 13A of the tapered portion 13, and the plating film with a smaller thickness (20 to 30 nm) was precipitated in a region closer to the distal end, as shown in FIG. 13. The diameter $d_M$ of a terminal end portion of the plating film formed with the uniform thickness is 3 $\mu$m, and the bottom diameter $d_F$ of a portion to be the aperture portion where the plating film with a smaller thickness is formed is 450 mn. This optical fiber probe 30 may be considered as a type of plasmon probe. Specifically, the distal end 13A of the tapered portion 13 of the optical fiber probe 30 is covered with a thin metal film, and a plasmon is excited on the surface of the metal film by optical irradiation. Also, the scattering efficiency at the distal end 13A of the tapered portion 13 is increased by a large dielectric constant (absolute value) of the metal in comparison with the probe tip having no metal coating.

As is clear from the above description, since the optical fiber probe 30 according to the present invention has the light-shielding coating layer 14 formed on the surface of the tapered portion 13 except for the portion on the periphery of the distal end of the tapered portion 13 by the electroless plating method and has the aperture portion through which the distal end 13A of the tapered portion 13 is protruding from the light-shielding coating layer 14, the light is selectively taken in from the protruding distal end 13A of the tapered portion 13, and the evanescent light may be detected with a high resolution without being affected by a disturbance light and the like. Also, in the electroless plating method, since the light-shielding coating layer 14 may be formed except for the distal end of the tapered portion 13, the metal etching step as in the above-described evaporation method is not required. In addition, since the electroless plating method is a wet coating method having a higher film forming speed than the vacuum evaporation method, the manufacturing efficiency may be significantly improved.

Figure 14:
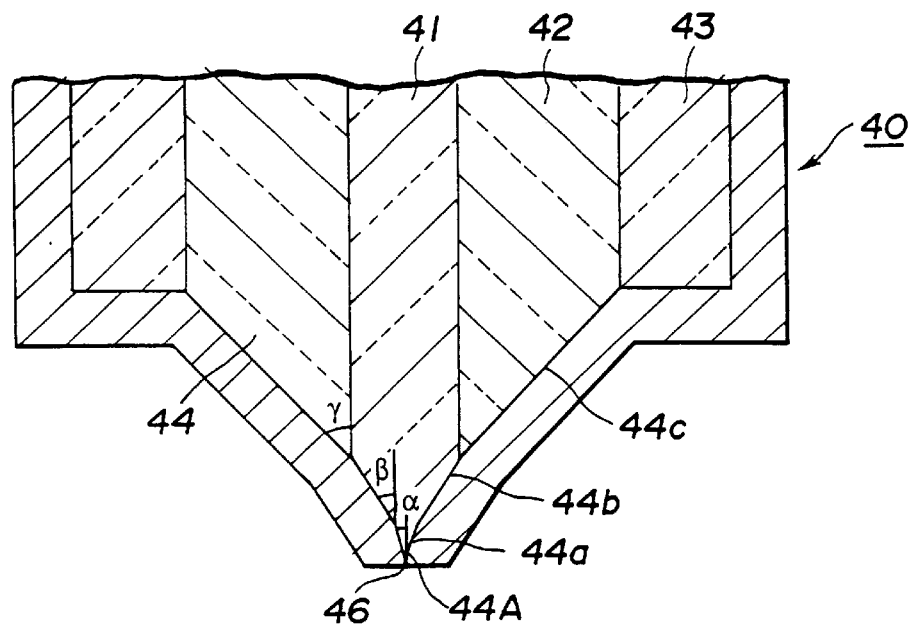
FIG. 14 is a cross-sectional view showing another example of the optical fiber probe having a light-shielding coating layer formed on a distal end portion thereof.

The optical fiber probe according to the present invention also has a structure as shown in FIG. 14. Specifically, an optical fiber probe 40 shown in FIG. 14 is made of an optical fiber having a first cladding 42 and a second cladding 43 provided around a core 41. The optical fiber has, at its one end, a tapered portion 44 formed by tapering the core 41 and the first cladding 42 which are protruding from a terminal of the second clad. In a light-shielding coating layer 45 covering the tapered portion 44, an aperture portion 46 is formed so that a distal end 44A of the tapered portion 44 is exposed. In this optical fiber probe 40, the core 41 is adapted for propagating a light of a single guided mode, and the first cladding 42 is adapted for propagating a light of plural guided modes. That is, the first cladding 42 functions as a cladding with respect to the core 41 and also functions as a multimode core.

Such optical fiber probe 40 may be used, for example, as an optical probe of a near-field optical microscope.

Figure 15:
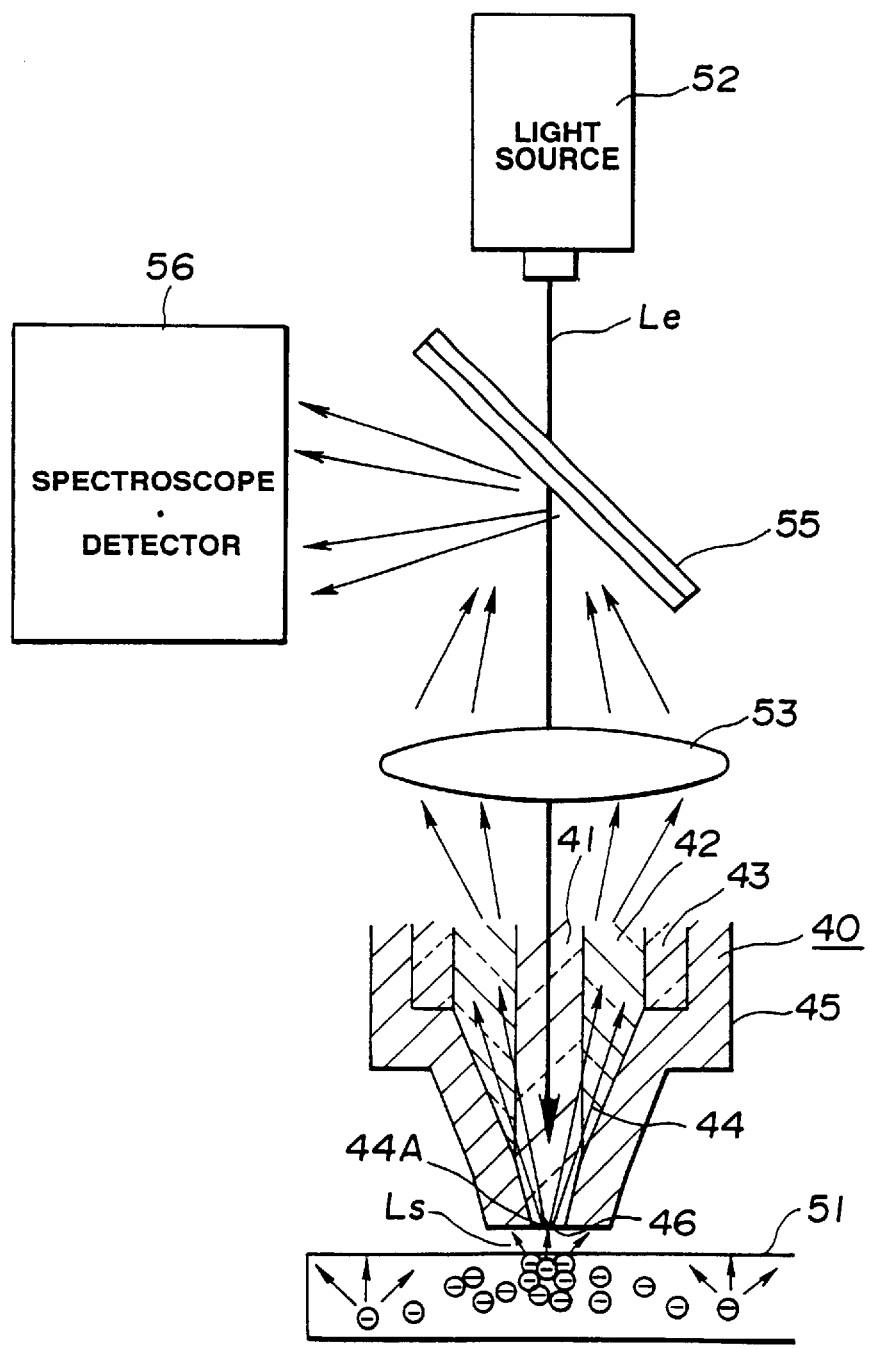
FIG. 15 is a schematic view showing an exemplary structure of a near-field optical microscope to which the optical fiber probe of the present invention is applied.

The structure of a near-field optical microscope 50 of illumination/collection mode using this optical fiber probe 40 is shown in FIG. 15.

In this near-field optical microscope 50, an excitation light Le generated from a light source 52 is transmitted through a dichroic mirror 55 and collected by a lens 53. The collected excitation light Le is taken in from a rear end portion of the optical fiber probe 40 and propagated in the core 41 while being repeatedly reflected on the interface between the core 41 and the first cladding 42. The excitation light Le propagated to the tapered portion 44 is collected by this tapered portion 44 and radiated from the distal end 44A of the tapered portion 44 through the aperture portion 46 onto a sample 51.

In the sample 51, such as, a semiconductor, irradiated with the excitation light Le, the excitation light is absorbed to generate electrons and holes. In this case, a light (detection light) Ls emitted at the time when the excited electrons are recombined with the holes is detected and spectrally split.

The detection light Ls generated from the sample 51 is taken in from the aperture portion 46 of the optical fiber probe 40 and propagated in the first cladding 42 while being repeatedly reflected on the interface between the first cladding 42 and the second cladding 43. The propagated detection light Ls is radiated from the rear end of the optical fiber probe 40 and reflected by the dichroic mirror 55 toward a photodetector 56. The photodetector 56 carries out detection and spectrum measurement of the light.

In such near-field optical microscope 50, both the irradiation with the excitation light Le and the condensation of the detection light Ls are carried out by the optical fiber probe 40. Therefore, even when the sample has a low optical transmittance, like a semiconductor, and in which the excited electrons are spatially diffused, the excitation light Le may be locally radiated to the detection position of the sample, and the detection light Ls generated by the optically excited sample 51 may be detected with a high spatial resolution.

Also, in the measurement of wavelength spectrum on light emission, since a light signal provided from the sample is very weak, it is important to increase the excitation efficiency (illumination efficiency) and the collection efficiency.

In the optical fiber probe 40, the excitation light Le is propagated in the core 41 which is adapted for propagating a light of a single guided mode, and the detection light Ls from the sample 51 is propagated in the first cladding 42 which is adapted for propagating a light of plural guided modes. In the single-mode core 41, since attenuation of the light is small, the loss of the excitation light may be suppressed to a small extent and a high excitation efficiency (illumination efficiency) may be obtained. On the other hand, in the multimode core (i.e., the first cladding 42), since there exist a number of guided modes which can be combined, the detection light Ls from the sample 51 may be efficiently collected. Therefore, the wavelength spectrum reflecting the characteristics of the sample may be measured with a high sensitivity.

It is to be noted that the shape of the tapered portion 44 of the optical fiber probe 40 is also important for increasing the excitation efficiency and the collection efficiency.

Thus, with respect to the optical fiber probe 40 according to the present invention which has the tapered portion 44 inclined in three stages having three inclinations, by controlling the angles α and β, both the excitation efficiency and the collection efficiency may be increased while a high resolution is maintained. The surfaces having the inclinations are hereinafter referred to as a first taper surface 44a, a second taper surface 44b and a third taper surface 44c from the distal end. The distal end shape of such optical fiber probe 40 is obtained by chemical etching or the like. As the etching solution, a buffer HF solution containing 40 wt % of $NH_4F$ solution, 50 wt % of HF acid and $H_2O$ is used.

The optical fiber probe 40 having the tapered portion inclined in three stages having three inclinations may be produced, for example, as follows.

First, a double-cladding optical fiber of the following materials was prepared.

| | |
|---|---|
| Core | $SiO_2$ doped with $GeO_2$ |
| | relative refractive index difference with respect to pure $SiO_2$: 1.2% |
| | outer diameter: 1.2 μm |
| First cladding | pure $SiO_2$ |
| | relative refractive index difference with respect to pure $SiO_2$: 0% |
| | outer diameter: 27 μm |
| Second cladding | $SiO_2$ doped with F |
| | relative refractive index difference with respect to pure $SiO_2$: −0.7% |
| | outer diameter: 125 μm |

Then, a tapered portion was formed at one end of the optical fiber by carrying out the following steps (1) to (3).
(1) Cladding inclination step Etching was carried out at one end of the optical fiber under the etching condition of $R_{11}=R_{21}<R_{31}$, where $R_{11}$ represents the etching rate of the core, $R_{21}$ represent the etching rate of the first cladding, and $R_3$, represents the etching rate of the second cladding. The etching solution is a buffer HF solution having the composition of 40 wt % of $NH_4F$ solution: 50 wt % of HF acid: $H_2O=1.7:1:1$ (volumetric ratio), and the etching time is 30 minutes.

(2) First tapering step

Then, etching was carried out at the one end of the optical fiber under the etching condition of $R_{12}<R_{22}<R_{32}$, where $R_{12}$ represents the etching rate of the core, $R_{22}$ represent the etching rate of the first cladding, and $R_{32}$ represents the etching rate of the second cladding. The etching solution is a buffer HF solution having the composition of 40 wt % of $NH_4F$ solution: 50 wt % of HF acid: $H_2O=10:1:1$ (volumetric ratio), and the etching time is 20 minutes.

(3) Second tapering step

Subsequently, etching was carried out at the one end of the optical fiber under the etching condition of $R_{13}>R_{23}<R_{33}$, where $R_{13}$ represents the etching rate of the core, $R_{23}$ represent the etching rate of the first cladding, and $R_{33}$ represents the etching rate of the second cladding. The etching solution is a buffer HF solution having the composition of 40 wt % of $NH_4F$ solution: 50 wt % of HF acid: $H_2O=1.7:1:5$ (volumetric ratio), and the etching time is 1 minute 30 seconds.

As a result, the tapered portion made by the first taper surface, the second taper surface and the third taper surface was formed at the one end of the optical fiber. The taper angle, cross-sectional diameter and tip length of each of the taper surfaces forming the tapered portion are provided as follows.

Taper angle $2\alpha$ of first taper surface: 20°

Taper angle $2\beta$ of second taper surface: 105°

Taper angle $2\gamma$ of third taper surface: 60°

Cross-sectional diameter $d_1$ of rear end of first taper surface: 0.5 μm

Cross-sectional diameter $d_2$ of rear end of second taper surface: 1.2 μm

Tip length L: 1 μm

The second cladding was completely removed by etching.

Figure 16:
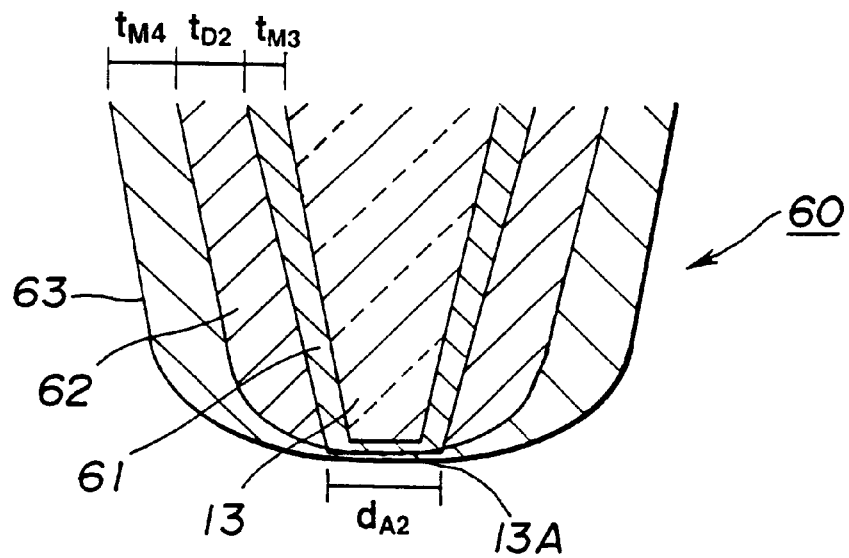
FIG. 16 is a cross-sectional view showing essential portions of an optical fiber probe having triple coating layers formed thereon.

The optical fiber probe according to the present invention also has a tapered portion 13 of a structure as shown in FIG. 16. An optical fiber probe 60 shown in FIG. 16 has a first metal layer 61, a dielectric layer 62 and a second metal layer 63 formed in this order on the surface of the tapered portion 13 of the optical fiber 10 shown in FIG. 3, and the thickness of the layers 61, 62, 63 is reduced at the distal end 13A of the tapered portion 13 in comparison with the outer peripheral surface.

In this optical fiber probe 60, a plasmon is excited on the surface of the first metal layer 61 by light irradiation. Therefore, this optical fiber probe 60 may be regarded as a type of plasmon probe.

In such optical fiber probe 60, the first metal layer 61 having a large dielectric constant (absolute value) is formed at the distal end 13A of the tapered portion 13. Therefore, in comparison with the case where no metal layer is formed, an evanescent field may be scattered with a higher scattering efficiency in the collection mode. Also, the second metal layer 63 provided on the outermost periphery is to be a light-shielding coating layer, which shields incidence of the light, and the light from the sample is selectively taken in from the distal end 13A where the thickness of the second metal layer 63 is reduced. That is, an aperture portion is formed on the periphery of the distal end 13A by the second metal layer 63. Thus, the evanescent light may be detected with a high resolution without being affected by a disturbance light or the like.

In this optical fiber probe 60, the first metal layer 61 is made of aluminum (Al), gold (Au), silver (Ag) or the like. It is preferred that the thickness $t_{M3}$ of the first metal layer 61 is 1 to 50 nm.

The second metal layer 63 is made of aluminum (Al), gold (Au), silver (Ag), nickel (Ni), chromium (Cr) or the like. The thickness $t_{M4}$ of the second metal layer 63 needs to be a thickness necessary for light shielding, for example, 100 nm or greater.

Moreover, in the case where the refractive index of the dielectric layer 62 is lower than the refractive index of the tapered portion 13, the dielectric layer 62 may function as a buffer layer which is well known in a metal waveguide. Specifically, excitation of the plasmon at the distal end 13A of the tapered portion 13 is suppressed by the dielectric layer 62, and loss of TM mode may be reduced.

As the material of the dielectric layer 62, magnesium difluoride ($MgF_2$) (with a refractive index of about 1.3) or the like is appropriate in the case where the tapered portion 13 is made of $SiO_2$ doped with $GeO_2$ (with a refractive index of about 1.5). To cause the dielectric layer 62 to function both as the buffer layer and as the light-shielding coating layer, it is preferred to provide the optical fiber probe 60 which has a dielectric having a thickness of 50 to 150 nm.

This optical fiber probe 60 is manufactured by an evaporation method. By sequentially heat-evaporating evaporation sources toward the fiber lateral surface while rotating the optical fiber in a high vacuum, the first metal layer 61, the dielectric layer 62 and the second metal layer 63 are formed.

The optical fiber probe 60 was actually manufactured under the following conditions.

| First metal layer | silver (Ag) thickness: 5 nm |
|---|---|
| Dielectric layer | magnesium difluoride ($MgF_2$) thickness: 120 nm |
| Second metal layer | aluminum (Al) thickness: 150 nm |

Meanwhile, in the optical fiber probe 60 having the dielectric layer 62 made of a material having a large refractive index, such as, zinc sulfide (ZnS) or zinc selenide (ZnSe), the wavelength of the light in the distal end region of the probe may be reduced, and consequently, the transmission efficiency may be increased. However, if the refractive index of the dielectric layer 62 becomes greater than the refractive index of the tapered portion 13, the dielectric layer cannot effectively function as a buffer layer.

The manufacturing method for an optical fiber probe according to the present invention will now be described.

Figure 17:
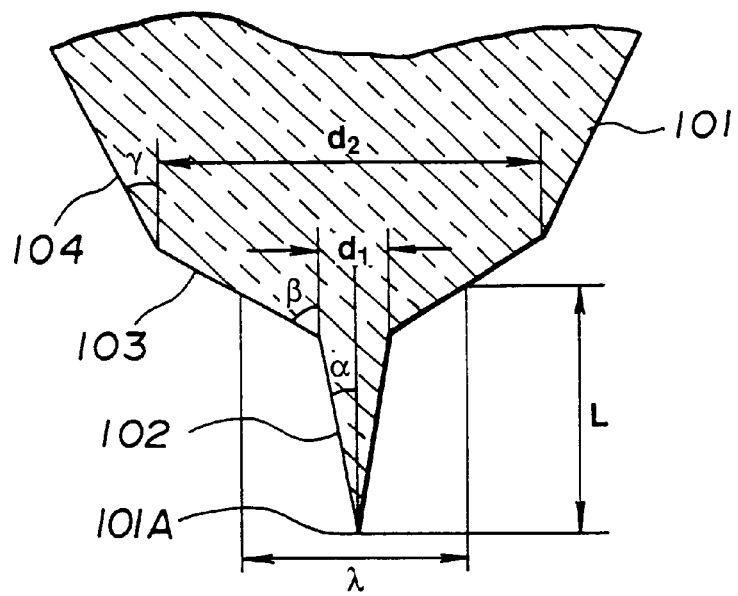
FIG. 17 is a cross-sectional view showing an example of a tapered portion of an optical fiber probe manufactured by a manufacturing method for an optical fiber probe according to the present invention.
Figure 18:
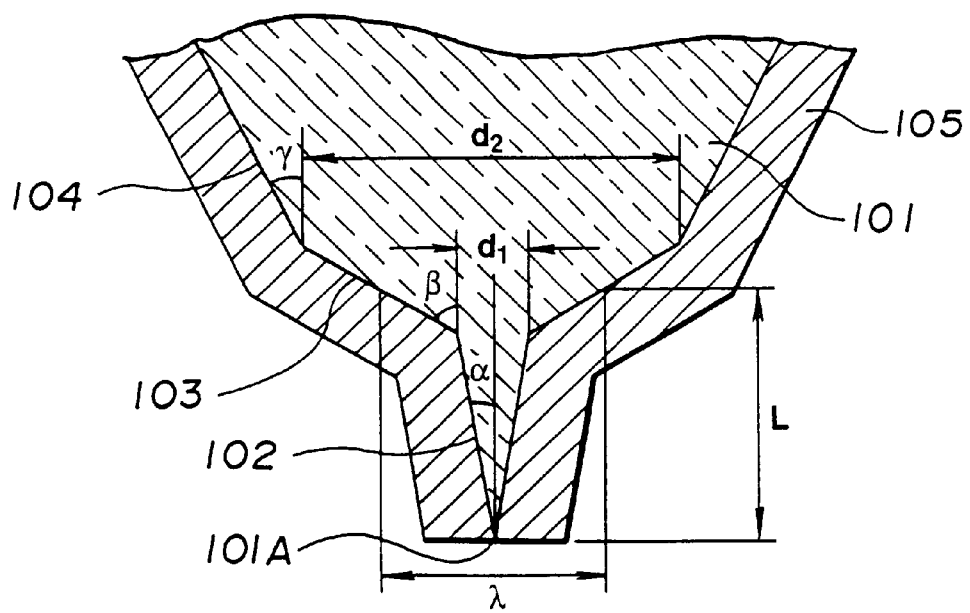
FIG. 18 is a cross-sectional view showing an example of an optical fiber probe having a light-shielding coating layer formed thereon.
Figure 19:
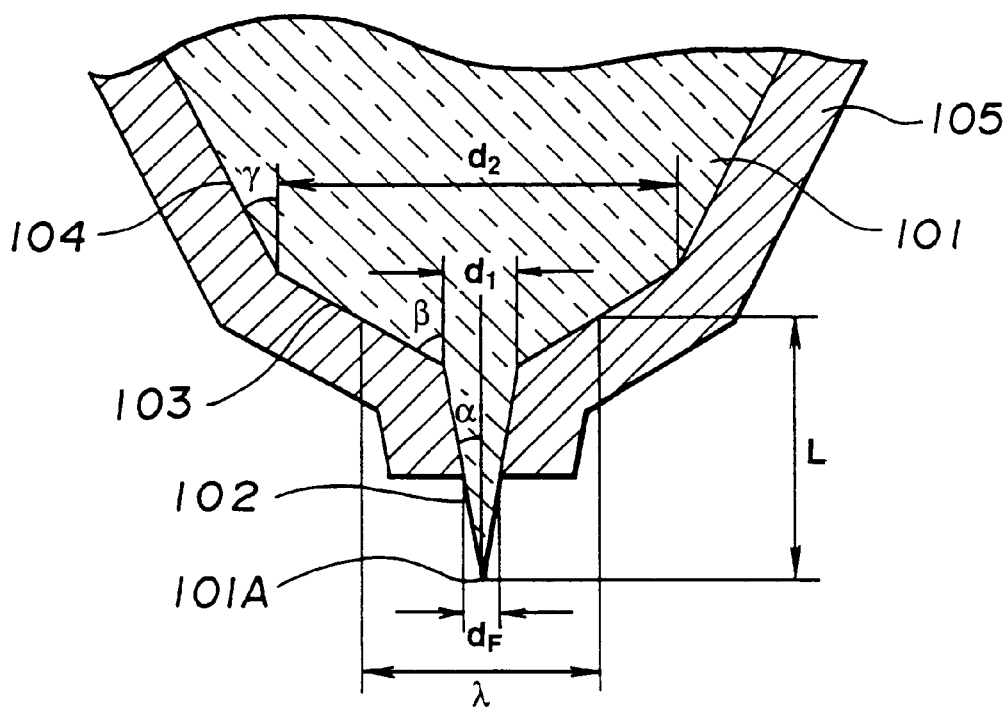
FIG. 19 is a cross-sectional view showing another example of the optical fiber probe having a light-shielding coating layer formed thereon.

An optical fiber probe manufactured by the manufacturing method to be described hereinafter is a probe tip for detecting a near field at its distal end made of a dielectric, as shown in FIG. 17, or an apertured probe having a light-shielding coating layer 105 formed in parts except for a distal end 101A of a tapered portion 101 and adapted for carrying out detection or irradiation of a light from an aperture portion at the distal end where the light-shielding coating layer 105 is not formed, as shown in FIGS. 18 and 19.

The optical fiber probe manufactured by the manufacturing method particularly has the tapered portion 101 inclined in three stages having three inclinations α, γ and γ, as shown in FIG. 17. The three surfaces having inclinations α, β and γ of the tapered portion 101 are hereinafter referred to as a first taper surface 102, a second taper surface 103 and a third taper surface 104 from the distal end. The angle of these taper surfaces 102, 103, 104 and an inclined portion with respect to the center axis of the optical fiber is referred to as an inclination, and the angle twice the inclination is referred to as a taper angle. In this optical fiber probe, it is preferred that the cross-sectional diameter $d_1$ of the rear end of the first taper surface 102 is equal to or smaller than the wavelength $\lambda$ of the propagated light and that the cross-sectional diameter $d_2$ of the rear end of the second taper surface 103 is equal to or greater than the wavelength $\lambda$ of the propagated light.

The manufacturing method for such optical fiber probe will now be described.

First, the probe tip is manufactured by a cladding inclination step of forming an inclined portion inclined from the outer periphery to the inner periphery at one end of a cladding of a fiber, a first tapering step of causing one end of a core to protrude from the cladding and conically tapering the one end by chemical etching, and a second tapering step of inclining the conically tapered one end of the core into two stages having two inclinations by chemical etching.

A specific example of the manufacturing method is explained hereinafter.

Figure 20:
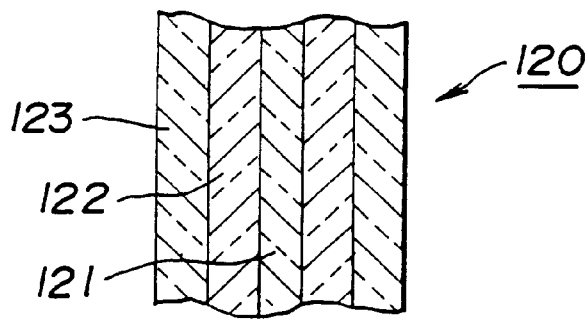
FIG. 20 is a cross-sectional view showing a specific example of the manufacturing method for an optical fiber probe in the order of steps, and showing an optical fiber before tapering.

In the specific example of the manufacturing method, an optical fiber probe is manufactured using a double-cladding optical fiber 120 which has a first cladding 122 provided around a core 121 and a second cladding 123 provided around the first cladding 122, as shown in FIG. 20.

Figure 21:
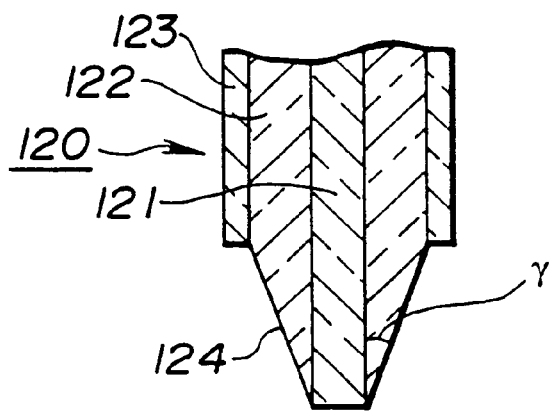
FIG. 21 is a cross-sectional view showing a cladding inclination step in the specific example of the manufacturing method.

First, an inclined portion 124 as shown in FIG. 21 is formed on the first cladding 122 by selective chemical etching of the first cladding 122 and the second cladding 123.

To form the inclined portion 124, etching is carried out under the etching condition of $R_{11}=R_{21}<R_{31}$, where $R_{11}$ represents the etching rate of the core 121, $R_{21}$ represents the etching rate of the first cladding 122, and $R_{31}$ represents the etching rate of the second cladding 123.

At this point, the inclined portion 124 inclined from the outer peripheral portion to the inner peripheral portion is formed on the first cladding 122, as shown in FIG. 21. The inclination $\gamma$ of the inclined portion is determined by the etching rates $R_{21}$ and $R_{31}$, and is expressed by the following equation.

$$\sin(\gamma)=R_{21}/R_{31}$$

Figure 22:
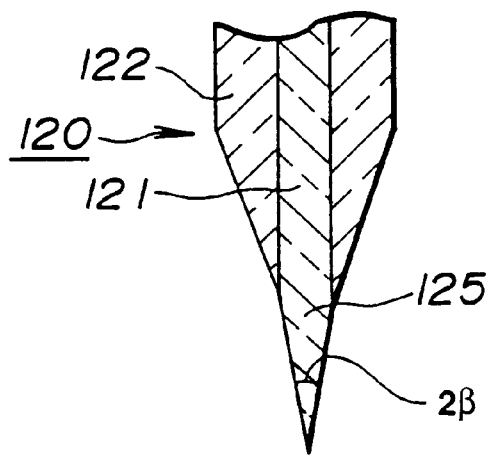
FIG. 22 is a cross-sectional view showing a first tapering step in the specific example of the manufacturing method.

After the inclined portion 124 is thus formed on the first cladding 122, one end of the core 121 is caused to protrude from the first cladding 122 and is conically tapered by the first tapering step, as shown in FIG. 22.

In the first tapering step, etching is carried out under the etching condition of $R_{12}<R_{22}<R_{32}$, where $R_{12}$ represents the etching rate of the core 121, $R_{22}$ represents the etching rate of the first cladding 122, and $R_{32}$ represents the etching rate of the second cladding 123.

At this point, a conical tapered portion 125 protruding from the cladding 122 is formed at one end of the core 121, as shown in FIG. 22. The taper angle $2\beta$ of the tapered portion 125 is determined by the etching rates $R_{12}$, $R_{22}$ and the inclination $\gamma$ of the cladding, and is expressed by the following equation.

$$\sin(\beta)=R_{12}/R_{22}\cdot-\sin(\gamma)$$

or $$\sin(\gamma)=R_{12}/R_{32}$$

The relation between the inclination $\gamma$ of the inclined portion 124 of the first cladding 122 and the etching rates $R_{22}$, $R_{32}$ is expressed by the following equation.

$$\sin(\gamma)=R_{22}/R_{32}$$

Figure 23:
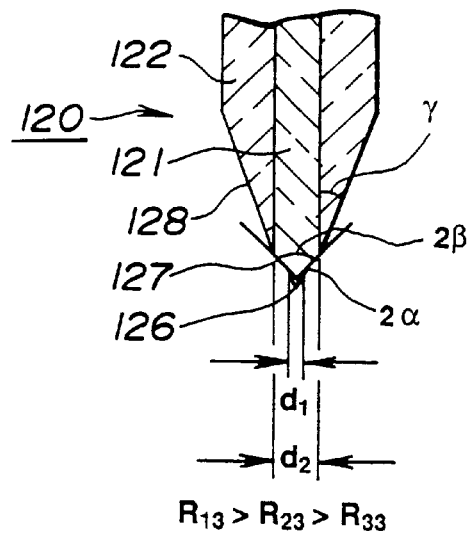
FIG. 23 is a cross-sectional view showing a second tapering step in the specific example of the manufacturing method.

Next, the one end of the core 121 thus conically tapered is inclined in two stages with two inclinations by the second tapering step, as shown in FIG. 23.

In the second tapering step, etching is carried out under the etching condition of $R_{13}>R_{23}<R_{33}$, where $R_{13}$ represents the etching rate of the core 121, $R_{23}$ represents the etching rate of the first cladding 122, and $R_{33}$ represents the etching rate of the second cladding 123.

At this point, an optical fiber probe is manufactured which has the tapered portion inclined in three stages having three inclinations, having a first taper surface 126 and a second taper surface 127 formed thereon and having a third taper surface 128 formed on the cladding 122.

The taper angle $2\alpha$ of the first taper surface 126 and the cross-sectional diameter $d_1$ of the rear end are determined by the taper angle $2\beta$ of the tapered portion 125 in the first tapering step and the etching rate $R_{13}$ and etching time of the core 121 in the second tapering step.

The taper angle $2\beta$ of the second taper surface is found by the following equation.

$$\sin(\beta)=R_{13}/R_{23}\cdot\sin(\gamma)$$

or $$\sin(\beta)=R_{13}/R_{33}$$

In addition, the cross-sectional diameter $d_2$ of the rear end of the second taper surface 127 coincides with the core diameter, and the inclination $\gamma$ of the third taper surface 128 coincides with the inclination in the cladding inclination step. The relation between the inclination $\gamma$ and the etching rates $R_{23}$, $R_{33}$ in the third etching step is expressed by the following equation.

$$\sin(\gamma)=R_{23}/R_{33}$$

Thus, in this specific example, the optical fiber probe is manufactured using the optical fiber 120 having the first cladding 122 and the second cladding 123 provided around the core 121. As the optical fiber 120, an optical fiber made of the following materials may be used.

| | |
|---|---|
| Core | $SiO_2$ doped with $GeO_2$ |
| First cladding | pure $SiO_2$ |
| Second cladding | $SiO_2$ doped with F |

In the case of the optical fiber 120 made of the materials as described above, the following etching solution is appropriately used in each step.

Cladding inclination step ($R_{11}=R_{21}<R_3$):
    buffer HF solution containing 40 wt % of $NH_4F$ solution: 50 wt % of HF
    acid: $H_2O$ at 1.7:1:1 (volumetric ratio)
First tapering step ($R_{12}<R_{22}<R_{32}$)
    buffer HF solution containing 40 wt % of $NH_4F$ solution: 50 wt % of HF
    acid: $H_2O$ at 10:1:1 (volumetric ratio)
Second tapering step ($R_{13}>R_{23}<R_{33}$)
    buffer HF solution containing 40 wt % of $NH_4F$ solution: 50 wt % of HF
    acid: $H_2O$ at 10:1:Y (volumetric ratio), where Y>30, or at 1.7:1:Y, where Y>1

By controlling (or reducing) the etching time in the cladding inclination step of this specific example, an optical fiber probe having the second cladding 123 and inclined in three stages may be provided. Such optical fiber probe may be used as a single-mode/multimode fiber which is adapted for propagating a light of a single guided mode in the core 121 and propagating a light of plural guided mode in the first cladding 122.

Figure 24:
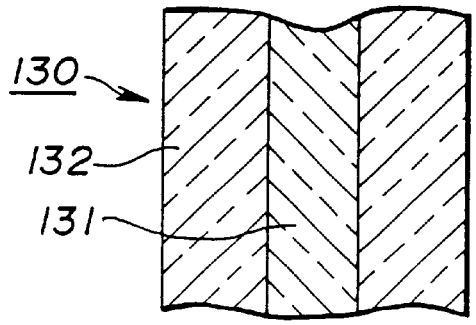
FIG. 24 is a cross-sectional view showing another specific example of the manufacturing method for an optical fiber probe in the order of steps, and showing an optical fiber before tapering.

In the next specific example, an optical fiber probe is manufactured using an optical fiber 130 having a cladding 132 provided around a core 131, as shown in FIG. 24.

First, an inclined portion is formed on the cladding 132 by melting and drawing the optical fiber 130.

Figure 25:
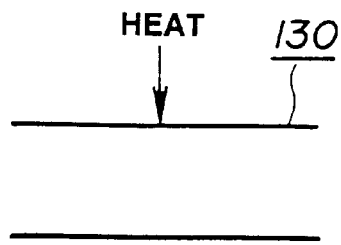
FIG. 25 is a schematic view showing a state that heat is applied to the optical fiber.
Figure 26:
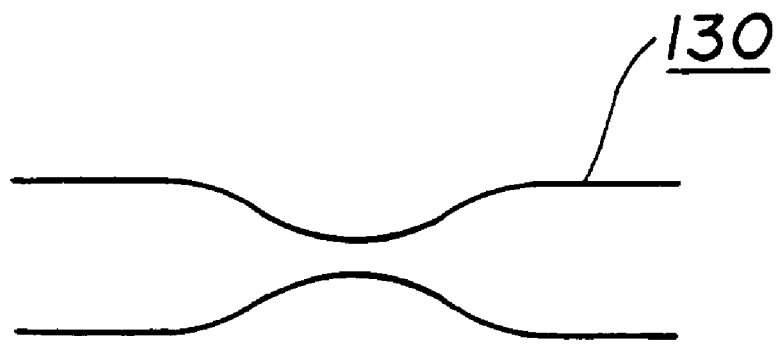
FIG. 26 is a schematic view showing the optical fiber which is melted and drawn.
Figure 27:
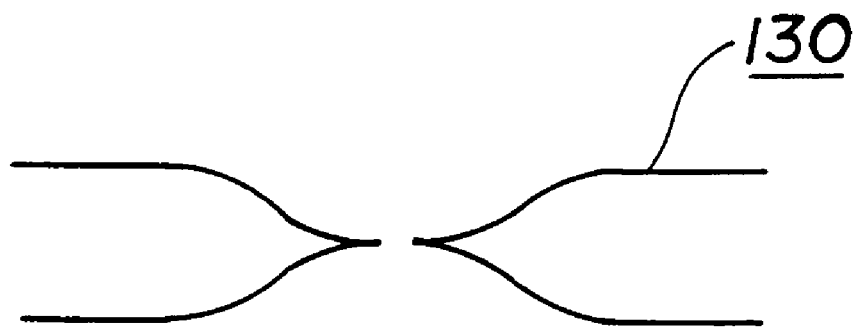
FIG. 27 is a schematic view showing the optical fiber which is separated.
Figure 28:
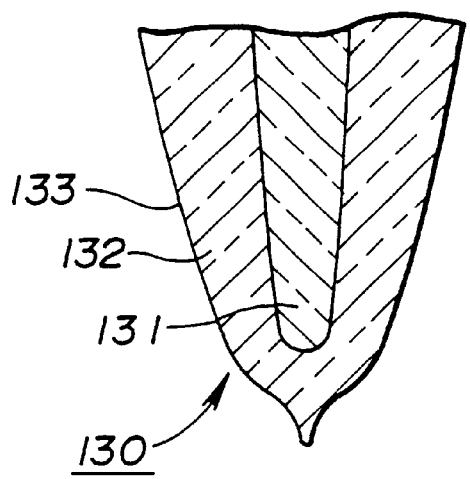
FIG. 28 is a cross-sectional view showing the shape of the optical fiber after melting and drawing.

To form the inclined portion, a part of the optical fiber 130 is melted by heating, as shown in FIG. 25, and the melted portion is drawn by laterally pulling both sides of the melted portion, as shown in FIG. 26. By further pulling the optical fiber 130, the optical fiber 130 is separated into two portions, as shown in FIG. 27. In the separated optical fiber 130, an inclined portion 133 is formed on the cladding 132 at the melted and drawn one end portion, and the portion toward the distal end from the inclined portion 133 takes an acute shape such as if a string were pulled, as shown in FIG. 28. The core 131 has its diameter on the distal end portion reduced by drawing, and has its distal end surface buried in the cladding 132. The shape of the distal end portion of the cladding such as if a string were pulled is removed by chemical etching in the next step.

Figure 29:
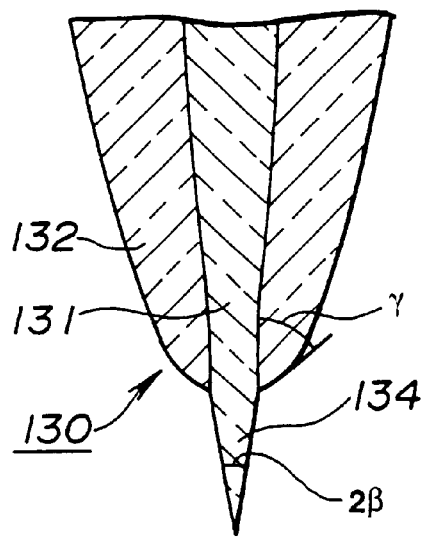
FIG. 29 is a cross-sectional view showing a first tapering step in another specific example of the manufacturing method.

After the optical fiber 130 is thus melted and drawn, one end of the core 131 is caused to protrude from the cladding 132 and this one end is conically tapered by a first tapering step, as shown in FIG. 29.

In the first tapering step, chemical etching is carried out under the etching condition of $R_{12}<R_{22}$, where $R_{12}$ represents the etching rate of the core 131 and $R_{22}$ represents the etching rate of the cladding 132. By such chemical etching, a conical tapered portion 134 protruding from the cladding is formed on one end of the core 131, as shown in FIG. 29. The taper angle $2\beta$ of the tapered portion 134 is determined by the etching rates $R_{12}$, $R_{22}$ and the inclination $\gamma$ of the inclined portion 133 of the cladding 132, and is expressed by the following equation.

$$\sin(\beta)=R_{12}/R_{22}\cdot\sin(\gamma)$$

Figure 30:
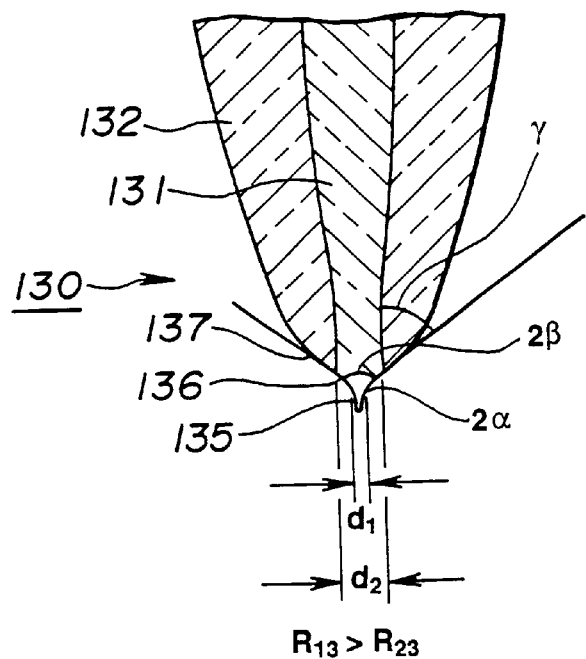
FIG. 30 is a cross-sectional view showing a second tapering step in another specific example of the manufacturing method.

Next, the one end of the core 131 thus conically tapered is inclined in two stages having two inclinations by a second tapering step, as shown in FIG. 30.

In the second tapering step, chemical etching is carried out under the etching condition of $R_{13}>R_{23}$, where $R_{13}$ represents the etching rate of the core 131 and R23 represents the etching rate of the cladding 132.

Thus, an optical fiber probe is manufactured which has the tapered portion inclined in three stages having three inclinations, having a first taper surface 135 and a second taper surface 136 of different inclinations formed on the core 131 and having a third taper surface 137 formed on the cladding 132, as shown in FIG. 30.

The taper angle $2\alpha$ of the first taper surface 135 and the cross-sectional diameter $d_1$ of the rear end are determined by the taper angle $2\beta$ of the tapered portion 134 in the first tapering step and the etching rate $R_{13}$ and etching time of the core 131 in the second tapering step.

The taper angle $2\beta$ of the second taper surface 136 is found by the following equation.

$$\sin(\beta)=R_{13}/R_{23}\cdot\sin(\gamma)$$

The cross-sectional diameter $d_2$ of the rear end of the second taper surface 136 coincides with the core diameter (i.e., the core diameter reduced by melting and drawing), and the inclination $\gamma$ of the third taper surface 137 coincides with the inclination in the cladding inclination step.

Thus, in this specific example, the optical fiber probe is produced using the optical fiber 130 having the cladding 132 provided around the core 131. As the optical fiber 130, an optical fiber made of the following materials may be used.

| Core | $SiO_2$ doped with $GeO_2$ |
|---|---|
| Cladding | pure $SiO_2$ |

In the case of the optical fiber made of the materials as described above, the following etching solution is appropriately used in each step.

First tapering step ($R_{12}<R_{22}$):
    buffer HF solution containing 40 wt % of $NH_4F$ solution: 50 wt % of HF
    acid: $H_2O$ at 10:1:1 (volumetric ratio)

Second tapering step ($R_{13}>R_{23}$):
    buffer HF solution containing 40 wt % of $NH_4F$ solution: 50 wt % of HF
    acid: $H_2O$ at 10:1:Y (volumetric ratio), where Y>30, or at 1.7:1:Y, where Y>1

In the next specific example, an optical fiber probe was manufactured in the following manner, using the optical fiber having the cladding 132 made of $SiO_2$ doped with F (or $SiO_2$ doped with $B_2O_3$) which is provided around the core 131 made of $SiO_2$ doped with OH or pure $SiO_2$.

Similar to the foregoing specific example, the optical fiber 130 is first melted and drawn. In the optical fiber 130 which has been melted and drawn, the inclined portion 133 is formed on the cladding 132 at the melted and drawn one end portion, and the portion toward the distal end from the inclined portion 133 takes an acute-angle shape such as if a string were pulled, as shown in FIG. 28. The core 131 has its diameter on the distal end portion reduced by drawing, and has its distal end surface buried in the cladding 132. The shape of the distal end portion of the cladding 132 such as if a string were pulled is removed by chemical etching in the next step.

After the optical fiber 130 is thus melted and drawn, one end of the core 131 is caused to protrude from the cladding 132 and this one end is conically tapered by a tapering step, as shown in FIG. 29.

In the tapering step, etching is carried out under the etching condition of $R_{12}<R_{22}$, where $R_{12}$ represents the etching rate of the core 131 and $R_{22}$ represents the etching rate of the cladding 132.

For example, in the tapering step using the optical fiber 130 having the core 131 made of pure $SiO_2$ and the cladding 132 made of $SiO_2$ doped with F, the value of $R_{12}/R_{22}$ is a constant value smaller than 1 in etching with a buffer solution having any composition. The buffer solution in this case is a mixed solution containing 40 wt % of $NH_4F$ solution: 50 wt % of HF acid: $H_2O$ at X:1:Y (volumetric ratio), where X, Y are arbitrarily determined. The taper angle $2\beta$ of the tapered portion 134 is determined by the etching rates $R_{12}$, $R_{22}$ and the inclination $\gamma$ of the cladding 132, and is expressed by the following equation.

$$\sin(\beta)=R_{12}/R_{22}\cdot\sin(\gamma)$$

The tapering processing was actually carried out with respect to the optical fiber 130 made of the following materials:

| | |
|---|---|
| core | SiO$_2$ doped with OH<br>OH doping quantity: 500 ppm<br>outer diameter: 1.2 μm |
| cladding | SiO$_2$ doped with F<br>relative refractive index difference with respect to pure SiO$_2$: −0.7%<br>outer diameter: 125 μm | under the following conditions:
   40 wt % of NH$_4$F solution: 50 wt % of HF acid: H$_2$O=10:1:1 (volumetric ratio)
   solution temperature: 25° C.
   processing time: 60 minutes.
   As a result of the above-described tapering processing, the distal end portion 133 of the optical fiber 130 was tapered with two inclinations. Specific dimensions were provided as follows.

| | |
|---|---|
| First taper surface | angle 2β: 40°<br>bottom diameter d$_1$: 0.1 μm |
| Second taper surface | angle 2γ: 70° |

The light-shielding coating layer 105 is formed by first forming a light-shielding metal film on the tapered portion by vacuum evaporation or electroless plating, then forming an etching mask thereon except for the distal end portion, and then carrying out etching to remove the metal film on the distal end portion.

To sufficiently shield the light on the periphery of the distal end with the light-shielding coating layer 105, it is preferred that the tip length L is selected to be approximately 100 to 300 nm.

Figure 31:
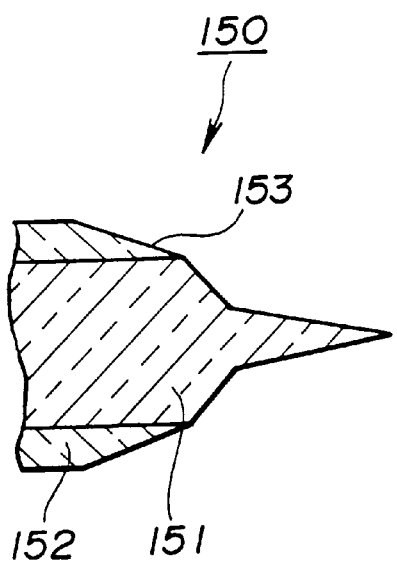
FIG. 31 is a cross-sectional view showing a method of forming a light-shielding coating layer in the order of steps, and showing a tapered portion before formation of the light-shielding coating layer.

A method of forming such light-shielding coating layer 105 on a tapered portion 153 of an optical fiber 150 having a cladding 152 provided around a core 151, as shown in FIG. 31, will now be described.

Figure 32:
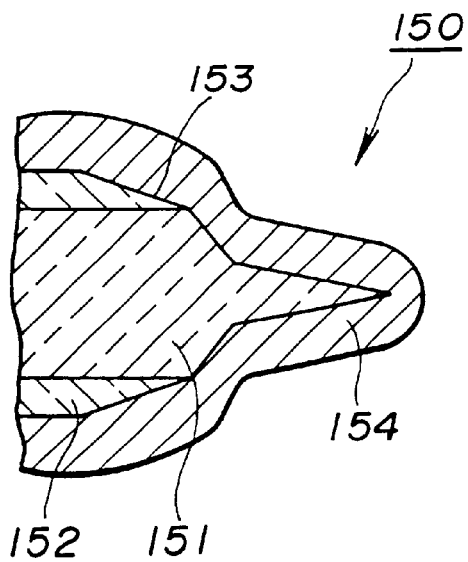
FIG. 32 is a cross-sectional view showing a coating layer forming step by vacuum evaporation.

Specifically, to form the light-shielding coating layer 105, using a vacuum evaporation unit, the optical fiber 150 is rotated around its center axis in a vacuum, and metal vapor is supplied and evaporated from the lateral side of the tapered portion 153. Thus, the light-shielding coating layer 154 is formed on the tapered portion 153, as shown in FIG. 32.

For the coating layer 154, a material having a high light shielding property and a high conductivity is used, such as, aluminum (Al), gold (Au), silver (Ag), and platinum (Pt). Aluminum (Al) is particularly preferred.

Figure 33:
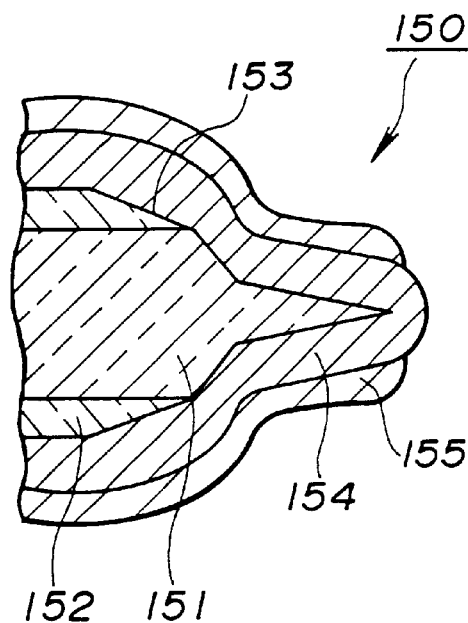
FIG. 33 is a cross-sectional view showing an etching mask forming step by vacuum evaporation.

Next, an etching mask 155 is formed on the coating layer 154 except for the distal end portion, as shown in FIG. 33. The etching mask 155 is formed by rotating the optical fiber 150 about its center axis in a vacuum and then supplying and evaporating vapor of an anticorrosive material, by using a vacuum evaporation unit.

In the vacuum evaporation, the metal vapor has a highly straight directionality. Therefore, by supplying the metal vapor from an obliquely rear side with respect to the tapered portion, the etching mask 155 may be formed only in the region except for the distal end portion without causing sneak path for the metal vapor to the distal end of the coating layer. For example, by supplying the metal vapor from a rear side such that the direction of incidence of the metal vapor makes an angle of 50° with the center axis of the optical fiber 150, the etching mask 155 is formed in a region as shown in FIG. 33.

The material of the etching mask 155 may be any material having an anticorrosive property against the etching solution in etching of the coating layer 154 in the next step. For example, chromium (Cr) may be appropriately used, and silver (Ag) or platinum (Pt) may also be used in consideration of the combination with the coating layer.

After the etching mask 155 is thus formed, the distal end of the optical fiber 150 having the coating layer 154 and the etching mask 155 formed thereon is impregnated with the etching solution, thus carrying out chemical etching.

Figure 34:
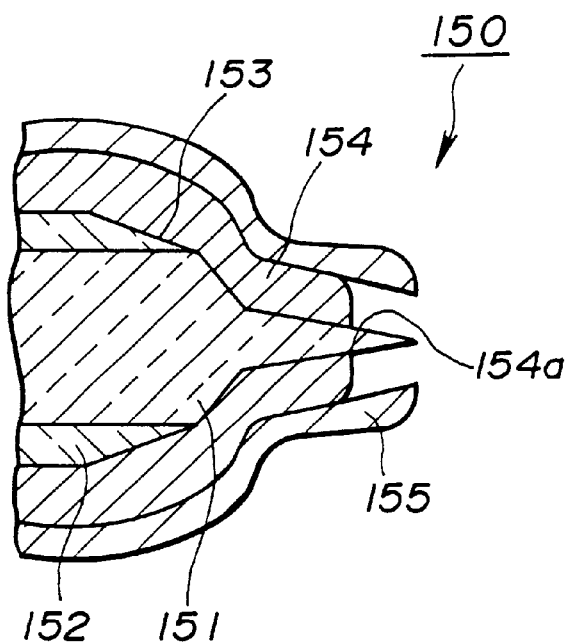
FIG. 34 is a cross-sectional view showing a coating layer etching step.

When the distal end of the optical fiber 150 is impregnated with the etching solution, only the coating layer 154 on the distal end portion where the etching mask 155 is not formed is selectively etched, and the light-shielding coating layer 154 having an aperture portion 154a at the distal end thereof is formed, as shown in FIG. 34. As the etching solution, an alkaline solution may be used, such as, NaOH solution.

Figure 35:
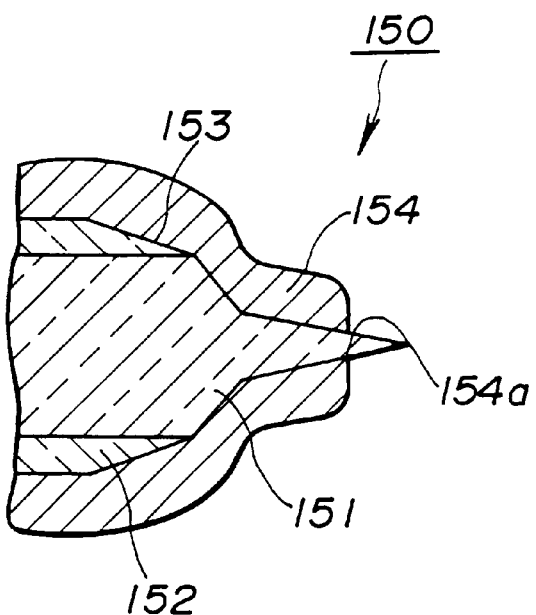
FIG. 35 is a cross-sectional view showing an etching mask removing step.

After that, the etching mask 155 is removed by treating the optical fiber 150, using an etching solution which dissolves the etching mask but does not dissolve the light-shielding coating layer 154, as shown in FIG. 35. Thus, the apertured probe is manufactured.

Figure 36:
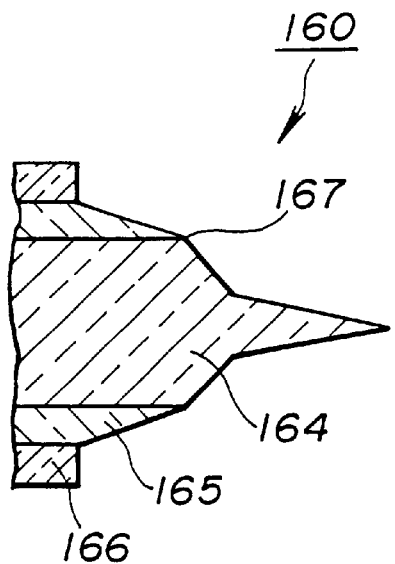
FIG. 36 is a cross-sectional view showing a tapered portion before formation of the light-shielding coating layer.

A method of forming a first light-shielding coating layer and a second light-shielding coating layer on a single-mode/multimode fiber 160 which has a first cladding 165 provided around a core 164 and a second cladding 166 provided around the first cladding 165, as shown in FIG. 36, will now be described. In this method, the first light-shielding coating layer is formed by electroless plating.

To form the first light-shielding coating layer by electroless plating, first, catalytic metal nuclei of palladium (Pd) are precipitated on the surface of a tapered portion 167, thus carrying out activation.

Specifically, the optical fiber 160 is impregnated with a stannum dichloride (SnCl$_2$) solution to deposit stannum (Sn) on the fiber surface, and then the optical fiber 160 is impregnated with a palladium dichloride (PdCl$_2$) solution. By thus impregnating the optical fiber 160 having stannum (Sn) deposited thereon with the palladium dichloride (PdCl$_2$) solution, palladium (Pd) is substituted for stannum (Sn), thus depositing catalytic metal nuclei of palladium on the fiber surface.

Activation may also be carried out by directly depositing palladium (Pd) on the surface of the tapered portion by a thin film forming technique, such as, sputtering.

Figure 37:
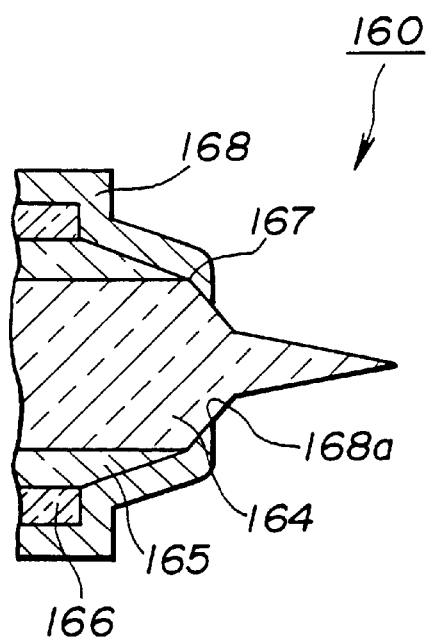
FIG. 37 is a cross-sectional view showing a first coating layer forming step by electroless plating.

On the surface of the activated tapered portion of the optical fiber, a plating film of nickel (Ni) or the like is formed using an electroless plating solution. The plating film is not precipitated in a small-sized portion, such as, the distal end portion of the tapered portion 167 because the reaction of dissolved oxygen is active. Therefore, by controlling the plating processing time, a first light-shielding coating layer 168 having an aperture portion 168a at its distal end is formed, as shown in FIG. 37.

Next, a second light-shielding coating layer 169 is formed on the first light-shielding coating layer 168.

Figure 38:
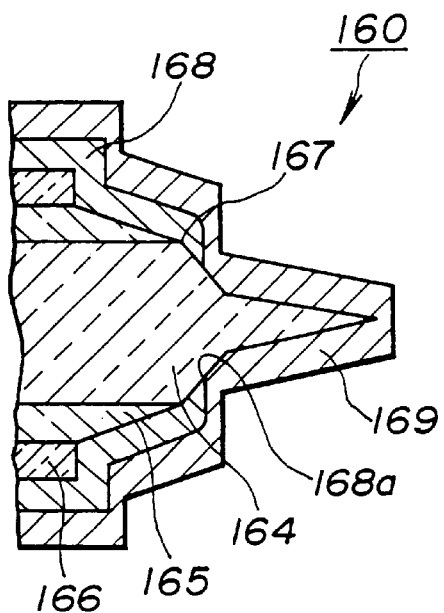
FIG. 38 is a cross-sectional view showing a second coating layer forming step by vacuum evaporation.

To form the second light-shielding coating layer 169, using a vacuum evaporation unit, the optical fiber is rotated about its center axis in a vacuum, and metal vapor is supplied and evaporated from the lateral side of the tapered portion. Thus, the second light-shielding coating layer 169 is formed as shown in FIG. 38.

For the second coating layer 169, a material having a high light shielding property and a high conductivity is used, such as, aluminum (Al), gold (Au), silver (Ag), and platinum (Pt). Aluminum (Al) is particularly preferred.

Figure 39:
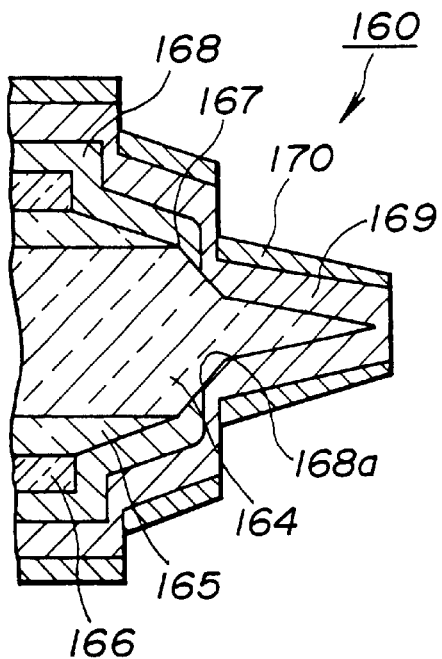
FIG. 39 is a cross-sectional view showing an etching mask forming step by vacuum evaporation.

Next, an etching mask 170 is formed on the second coating layer 169 except for the distal end portion, as shown in FIG. 39. The etching mask 170 is formed by rotating the optical fiber 160 about its center axis in a vacuum and then supplying and evaporating vapor of an anticorrosive material, by using a vacuum evaporation unit.

The material of the etching mask 170 may be any material having an anticorrosive property against the etching solution in etching of the second coating layer 169 in the next step. For example, chromium (Cr) may be appropriately used, and silver (Ag) or platinum (Pt) may also be used in consideration of the combination with the coating layer.

After the etching mask is thus formed, the distal end of the optical fiber 160 having the second coating layer 169 and the etching mask 170 formed thereon is impregnated with the etching solution, thus carrying out chemical etching.

Figure 40:
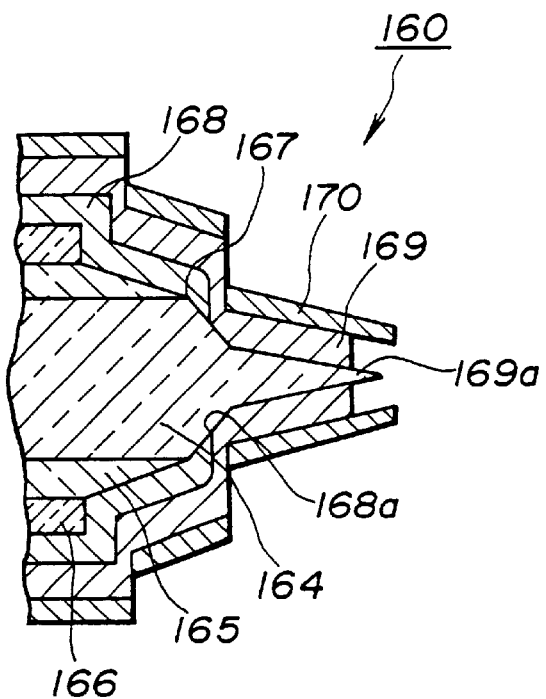
FIG. 40 is a cross-sectional view showing a second coating layer etching step.

When the distal end of the optical fiber 160 is impregnated with the etching solution, only the second coating layer 169 on the distal end portion where the etching mask 170 is not formed is selectively etched, and the second light-shielding coating layer 169 having an aperture portion 169a at the distal end thereof is formed, as shown in FIG. 40. As the etching solution, a strong alkaline solution may be used, such as, NaOH solution.

Figure 41:
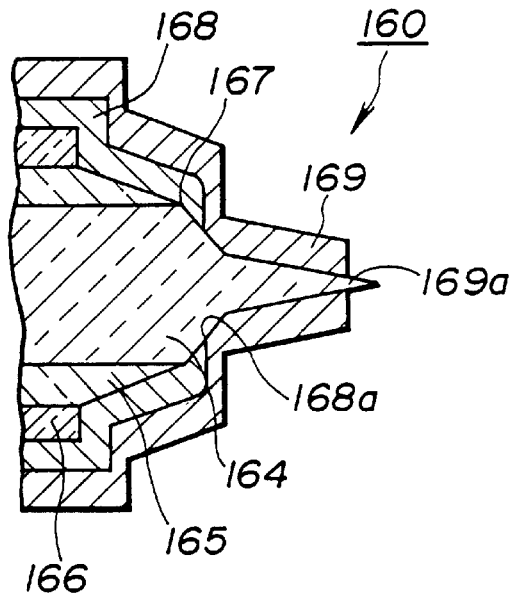
FIG. 41 a cross-sectional view showing an etching mask removing step.

After that, the etching mask is removed by treating the optical fiber 160, using an etching solution which dissolves the etching mask 170 but does not dissolve the second light-shielding coating layer 169, as shown in FIG. 41. Thus, the apertured probe is manufactured.

The examples of formation of the light-shielding coating layer are described above. In the apertured probes thus having the light-shielding coating layer formed on the tapered portion tapered with three inclinations, the tip length L may be reduced by increasing the inclination β of the second taper surface even when the taper angle 2α of the first taper surface is reduced.

Therefore, the problems of the apertured probes, that is, the large loss of light in a range equal to or smaller than the wavelength and the insufficient light shielding property near the aperture portion in the case where the inclination of the first taper surface is large, may be avoided, and thus a high transmission efficiency and a high resolution may be provided.

The inclination γ of the third taper surface does not directly affect the resolution or the transmission efficiency. However, in the case where the light-shielding coating layer is formed by vacuum evaporation, it is preferred that the inclination γ is reduced to the minimum possible value.

Another specific example of the manufacturing method for an optical fiber probe according to the present invention will now be described on the basis of experiment results.

First, an optical fiber made of the following materials was prepared.

| | |
|---|---|
| Core | $SiO_2$ doped with $GeO_2$ |
| | relative refractive index difference with respect to pure $SiO_2$: 1.2% |
| | outer diameter: 2 μm |
| Cladding | pure $SiO_2$ |
| | relative refractive index difference with respect to pure $SiO_2$: 0% |
| | outer diameter: 125 μm |

Then, a tapered portion was formed on one end of the optical fiber by carrying out the following melting and drawing step (1), first tapering step (2), and second tapering step (3).

(1) Cladding inclination step

Using a micro-pipet puller (trade name P-2000, manufactured by Sutter), a part of the optical fiber was melted by heating, and the fiber was split into two portions by pulling both sides of the melted part.

(2) First tapering step

One end of one of the split optical fiber was etched under the etching condition of $R_{12} < R_{22}$, where $R_{12}$ represents the etching rate of the core and $R_{22}$ represents the etching rate of the cladding. The etching solution is a buffer HF solution containing 40 wt % of $NH_4F$ solution: 50 wt % of HF acid: $H_2O$ at a (volumetric) ratio of 10:1:1. The etching time is 30 minutes.

(3) Second tapering step

The one end of the optical fiber was etched under the etching condition of $R_{13} > R_{23}$, where $R_{13}$ represents the etching rate of the core and $R_{23}$ represents the etching rate of the cladding. The etching solution is a buffer HF solution containing 40 wt % of $NH_4F$ solution: 50 wt % of HF acid: $H_2O$ at a (volumetric) ratio of 1.7:1:5. The etching time is 9 seconds.

As a result, the tapered portion including a first taper surface, a second taper surface and a third taper surface was formed on one end of the optical fiber. The taper angle and cross-sectional diameter of each taper surface of the tapered portion and the tip length were provided as follows.

Taper angle 2α of first taper surface: 20°

Taper angle 2β of second taper surface: 105°

Taper angle 2γ of third taper surface: 60°

Cross-sectional diameter $d_1$ of rear end of first taper surface: 0.1 μm

Cross-sectional diameter $d_2$ of rear end of second taper surface: 0.2 μm

Tip length L: 0.3 μm

Distal end diameter of first taper surface: several nm or less

What is claimed is:

1. An optical fiber probe comprising an optical fiber having a cladding provided around a core, the optical fiber having, at one end thereof, a tapered portion inclined in three stages having three inclinations.

2. The optical fiber probe as claimed in claim 1, wherein the inclination of the second stage from a distal end of the tapered portion is 30 to 90°, and wherein the inclinations of the first stage and the third stage from the distal end are smaller than the inclination of the second stage.

3. The optical fiber probe as claimed in claim 2, wherein the bottom diameter of a taper surface of the first stage from the distal end of the tapered portion is equal to or smaller than the wavelength of a propagated light.

4. The optical fiber probe as claimed in claim 1, wherein the tapered portion is provided at one end of the optical fiber having a cladding made of quartz ($SiO_2$) doped with fluorine (F) around a core made of quartz doped with OH or pure quartz ($SiO_2$).

5. The optical fiber probe as claimed in claim 1, further comprising a light-shielding coating layer formed on the surface of the tapered portion except for a portion on the periphery of the distal end of the tapered portion, wherein the distal end of the tapered portion is exposed from the light-shielding coating layer through an aperture portion.

6. The optical fiber probe as claimed in claim 1, further comprising a light-shielding coating layer formed on the surface of the tapered portion except for a portion on the periphery of the distal end of the tapered portion, wherein the distal end of the tapered portion is protruding from the light-shielding coating layer through an aperture portion.

7. The optical fiber probe as claimed in claim 5 or 6, wherein the light-shielding coating layer is formed on the surface of the tapered portion by vacuum evaporation and chemical etching.

8. The optical fiber probe as claimed in claim 1, further comprising a light-shielding coating layer formed on the surface of the tapered portion except for a portion on the periphery of the distal end of the tapered portion by electroless plating, wherein the distal end of the tapered portion is protruding from the light-shielding coating layer through an aperture portion.

9. The optical fiber probe as claimed in claim 8, wherein the light-shielding coating layer is formed with a uniform thickness up to a halfway portion of the tapered portion, with the thickness decreasing from the halfway portion to a position where the thickness corresponds to the aperture diameter of the aperture portion.

10. The optical fiber probe as claimed in claim 1, wherein a first metal layer, a dielectric layer and a second metal layer are formed on the surface of the tapered portion.

11. The optical fiber probe as claimed in claim 10, wherein the dielectric layer has a refractive index n lower than the refractive index n of the tapered portion.

12. The optical fiber probe as claimed in claim 10, wherein the first metal layer, the dielectric layer and the second metal layer have thicknesses smaller at the distal end of the tapered portion than in other regions.

13. The optical fiber probe as claimed in claim 9, wherein the first metal layer has a thickness of 1 to 50 nm and the second metal layer has a thickness of 100 nm or greater in regions other than the distal end of the tapered portion.

14. The optical fiber probe as claimed in claim 10, wherein the first metal layer is formed except for the distal end portion.

15. An optical fiber probe comprising an optical fiber having a first cladding and a second cladding provided around a core, the optical fiber probe having a tapered portion inclined in three stages having three inclinations which is formed by tapering the core and the first cladding protruding from a terminal of the second clad, the core being adapted for propagating a light of a single guided mode, the first cladding being adapted for propagating a light of plural guided modes.

16. A manufacturing method for an optical fiber probe comprising the steps of carrying out etching on one end of an optical fiber having a second core, a first cladding and a second cladding provided in this order around a first core, in which a radius $r_4$ of an outer peripheral surface of the second cladding is $r_4 \leq r_{4P}$, where $r_{4P} = r_3 + (r_3 - r_2)[(R_2 + R_3)/(R_3 - R_2)]^{1/2}$ $r_2$: radius of the outer peripheral surface of the second core $r_3$: radius of the outer peripheral surface of the first cladding $R_2$: dissolution rate of the second core $R_3$: dissolution rate of the first cladding under the condition of $R_1 = R_2 < R_3 < R_4$ $R_1$: dissolution rate of the first core $R_2$: dissolution rate of the second core $R_3$: dissolution rate of the first cladding $R_4$: dissolution rate of the second cladding, and then performing chemical etching under the condition of $R_1 < R_2 < R_3 < R_4$ so as to form a tapered portion inclined in three stages having three inclinations by chemical etching.

17. The manufacturing method for an optical fiber probe as claimed in claim 16, wherein after the tapered portion inclined in three stages having three inclinations is formed at one end of the optical fiber, a light-shielding coating layer is formed except for the distal end of the tapered portion by vacuum evaporation and chemical etching.

18. The manufacturing method for an optical fiber probe as claimed in claim 16, wherein after the tapered portion inclined in three stages having three inclinations is formed at one end of the optical fiber, a light-shielding coating layer is formed except for the distal end of the tapered portion by electroless plating.

19. A manufacturing method for an optical fiber probe comprising:

a cladding inclination step of forming an inclined portion inclined from the outer periphery to the inner periphery at one end of a cladding of an optical fiber which has the cladding provided around a core;

a first tapering step of causing one end of the core to protrude from the cladding and conically tapering the one end by chemical etching; and a second tapering step of inclining the conically tapered one end of the core into two stages having two inclinations by chemical etching.

20. The manufacturing method for an optical fiber probe as claimed in claim 19, wherein in the cladding inclination step, the inclined portion is formed at one end of the cladding by melting and drawing the optical fiber.

21. The manufacturing method for an optical fiber probe as claimed in claim 19, wherein in the first tapering step, etching is carried out under the condition satisfying $R_{12} < R_{22}$ where $R_{12}$ represents the etching rate of the core and $R_{22}$ represents the etching rate of the cladding.

22. The manufacturing method for an optical fiber probe as claimed in claim 19, wherein in the second tapering step, etching is carried out under the condition satisfying $R_{13} > R_{23}$ where $R_{13}$ represents the etching rate of the core and $R_{23}$ represents the etching rate of the cladding.

23. The manufacturing method for an optical fiber probe as claimed in claim 22, wherein after the second tapering step, a light-shielding coating layer is formed at one end of the tapered optical fiber except for the distal end portion of the core.

24. A manufacturing method for an optical fiber probe comprising:

a cladding inclination step of forming an inclined portion inclined from the outer periphery to the inner periphery at one end of a first cladding of an optical fiber which has the first cladding and a second cladding provided around a core;

a first tapering step of causing one end of the core to protrude from the first cladding and conically tapering the one end by chemical etching; and a second tapering step of inclining the conically tapered one end of the core into two stages having two inclinations by chemical etching.

25. The manufacturing method for an optical fiber probe as claimed in claim 24, wherein in the cladding inclination step, etching is carried out under the condition satisfying $R_{11} = R_{21} < R_{31}$ where $R_{11}$ represents the etching rate of the core, $R_{21}$ represents the etching rate of the first cladding, and $R_{31}$ represents the etching rate of the second cladding.

26. The manufacturing method for an optical fiber probe as claimed in claim 24, wherein in the first tapering step, etching is carried out under the condition satisfying $R_{12} < R_{22}2 < R_{32}$ where $R_{12}$ represents the etching rate of the core, $R_{22}$ represents the etching rate of the first cladding, and $R_{32}$ represents the etching rate of the second cladding.

27. The manufacturing method for an optical fiber probe as claimed in claim 24, wherein in the second tapering step, chemical etching is carried out under the condition satisfying $R_{13} > R_{23} < R_{33}$ where $R_{13}$ represents the etching rate of the core, $R_{23}$ represents the etching rate of the first cladding, and $R_{33}$ represents the etching rate of the second cladding.

28. The manufacturing method for an optical fiber probe as claimed in claim 27, wherein after the second tapering step, a light-shielding coating layer is formed at one end of the tapered optical fiber.

29. A manufacturing method for an optical fiber probe comprising:
    a cladding inclination step of forming an inclined portion inclined from the outer periphery to the inner periphery at one end of a cladding of an optical fiber which has a second core and the cladding provided around a first core; and
    a tapering step of causing one end of the first core and one end of the second core to protrude from the cladding and inclining the one end of the first core and the one end of the second core into two stages having two inclinations by chemical etching.

30. The manufacturing method for an optical fiber probe as claimed in claim 29, wherein in the cladding inclination step, the inclined portion is formed at one end of the cladding by melting and drawing the optical fiber.

31. The manufacturing method for an optical fiber probe as claimed in claim 29, wherein in the tapering step, etching is carried out under the condition satisfying $R_{12} < R_{22} < R_{32}$ where $R_{12}$ represents the etching rate of the first core, $R_{22}$ represents the etching rate of the second core, and $R_{32}$ represents the etching rate of the cladding.

32. The manufacturing method for an optical fiber probe as claimed in claim 31, wherein the one end of the first core is inclined in two stages having two inclinations by carrying out, after the tapering step, chemical etching under the condition satisfying $R_{13} > R_{23} < R_{33}$ where $R_{13}$ represents the etching rate of the first core, $R_{23}$ represents the etching rate of the second core, and $R_{33}$ represents the etching rate of the cladding.

33. The manufacturing method for an optical fiber probe as claimed in claim 32, wherein after the tapering step, a light-shielding coating layer is formed at one end of the tapered optical fiber.

* * * * *